(12) United States Patent
Ishikawa et al.

(10) Patent No.: US 9,350,602 B2
(45) Date of Patent: *May 24, 2016

(54) COMMUNICATION MONITOR, PREDICTION METHOD, AND RECORDING MEDIUM

(71) Applicant: FUJITSU LIMITED, Kawasaki-shi, Kanagawa (JP)

(72) Inventors: Yuuichi Ishikawa, Yokohama (JP); Junichi Yoshio, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

This patent is subject to a terminal disclaimer.

(21) Appl. No.: 14/085,075

(22) Filed: Nov. 20, 2013

(65) Prior Publication Data

US 2014/0198654 A1     Jul. 17, 2014

(30) Foreign Application Priority Data

Jan. 16, 2013   (JP) ................................. 2013-005798

(51) Int. Cl.
| | |
|---|---|
| *H04L 12/801* | (2013.01) |
| *H04L 12/24* | (2006.01) |
| *H04L 12/721* | (2013.01) |
| *H04L 12/26* | (2006.01) |

(52) U.S. Cl.
CPC ........ *H04L 41/0631* (2013.01); *H04L 41/0609* (2013.01); *H04L 47/11* (2013.01); *H04L 41/0618* (2013.01); *H04L 41/0622* (2013.01); *H04L 41/147* (2013.01); *H04L 43/0829* (2013.01); *H04L 45/70* (2013.01)

(58) Field of Classification Search
None
See application file for complete search history.

(56) References Cited

U.S. PATENT DOCUMENTS

| | | | | |
|---|---|---|---|---|
| 5,757,774 A | * | 5/1998 | Oka ............................... | 370/242 |
| 7,701,843 B1 | * | 4/2010 | Licari et al. .................. | 370/216 |
| 8,015,278 B1 | * | 9/2011 | Papa et al. ..................... | 709/224 |
| 2005/0013245 A1 | * | 1/2005 | Sreemanthula et al. ...... | 370/229 |

(Continued)

FOREIGN PATENT DOCUMENTS

| | | |
|---|---|---|
| JP | 2005-285040 | 10/2005 |
| JP | 2009-10438 | 1/2009 |

OTHER PUBLICATIONS

U.S. Appl. No. 14/075,489, filed Nov. 8, 2013, Yuiichi Ishikawa, Fujitsu Limited.

(Continued)

*Primary Examiner* — Bunjob Jaroenchonwanit
(74) *Attorney, Agent, or Firm* — Staas & Halsey LLP

(57) ABSTRACT

An importance degree prediction apparatus includes a path change determination unit that generates alarm path change information including path change information when a path is changed and an alarm developing when the path is changed in a network. The apparatus includes a reception unit that searches alarm path change information of a new alarm when the alarm is received from a development prediction apparatus, and a prediction unit that predicts a traffic amount in a post-change path based on a traffic amount in a pre-change path in the searched alarm path change information. The apparatus includes a calculation unit that calculates a criticality degree in the network based on a ratio of the predicted traffic amount in the post-change path that exceeds a predetermined allowable amount, and a determination unit that determines an alarm importance degree of the received alarm corresponding to an influence degree based on the criticality degree.

8 Claims, 28 Drawing Sheets

(56) References Cited

U.S. PATENT DOCUMENTS

| | | | |
|---|---|---|---|
| 2007/0204159 A1* | 8/2007 | Hara | 713/171 |
| 2008/0080384 A1* | 4/2008 | Atkins et al. | 370/252 |
| 2008/0133517 A1* | 6/2008 | Kapoor et al. | 707/6 |
| 2010/0128596 A1* | 5/2010 | Saitoh | 370/216 |
| 2010/0205289 A1* | 8/2010 | Miyazaki | 709/223 |
| 2011/0205898 A1 | 8/2011 | Ichiki et al. | |
| 2013/0138650 A1* | 5/2013 | Fujii et al. | 707/736 |
| 2013/0329571 A1* | 12/2013 | Shimokawa et al. | 370/244 |
| 2014/0198654 A1* | 7/2014 | Ishikawa et al. | 370/235 |
| 2014/0198660 A1* | 7/2014 | Ishikawa et al. | 370/236 |

OTHER PUBLICATIONS

Office Action issued Jul. 15, 2015 in U.S. Appl. No. 14/075,489.

\* cited by examiner

FIG.5

| LINK NAME | DEVICE NAME | PORT NAME | DEVICE NAME | PORT NAME | MAXIMUM TRAFFIC AMOUNT |
|---|---|---|---|---|---|
| LINK L1 | NW DEVICE x | x1 | NW DEVICE a | a1 | 100 |
| LINK L2 | NW DEVICE a | a2 | NW DEVICE c | c2 | 100 |
| LINK L3 | NW DEVICE c | c1 | NW DEVICE y | y1 | 100 |
| LINK L4 | NW DEVICE x | x2 | NW DEVICE b | b2 | 100 |
| LINK L5 | NW DEVICE b | b1 | NW DEVICE d | d1 | 100 |
| LINK L6 | NW DEVICE d | d2 | NW DEVICE y | y2 | 100 |
| LINK L7 | NW DEVICE a | a3 | NW DEVICE b | b3 | 100 |
| LINK L8 | NW DEVICE c | c3 | NW DEVICE d | d3 | 100 |

FIG.6

| PATH NAME | LINK L1 | LINK L2 | LINK L3 | LINK L4 | LINK L5 | LINK L6 | LINK L7 | LINK L8 |
|---|---|---|---|---|---|---|---|---|
| PATH R1 | 1 | 1 | 1 | | | | | |
| PATH R2 | 1 | | | | 1 | 1 | 1 | |
| PATH R3 | | | | 1 | 1 | 1 | | |
| PATH R4 | | 1 | 1 | 1 | | | 1 | |
| PATH R5 | | | 1 | 1 | 1 | | | 1 |

FIG.17

| USER NAME | LINK L1 | LINK L2 | LINK L3 | LINK L4 | LINK L5 | LINK L6 | LINK L7 | LINK L8 |
|---|---|---|---|---|---|---|---|---|
| USER A | 59 | 60 | 60 | | | | | |
| USER B | | | | 40 | 40 | 39 | | |
| USER C | | | 30 | 30 | 30 | | | 30 |

FIG.18

| PATH NAME | LINK L1 | LINK L2 | LINK L3 | LINK L4 | LINK L5 | LINK L6 | LINK L7 | LINK L8 |
|---|---|---|---|---|---|---|---|---|
| PATH R1 | 59 | 60 | 60 | | | | | |
| PATH R2 | | | | | | | | |
| PATH R3 | | | | 40 | 40 | 39 | | |
| PATH R4 | | | | | | | | |
| PATH R5 | | | 30 | 30 | 30 | | | 30 |

COMMUNICATION MONITOR, PREDICTION METHOD, AND RECORDING MEDIUM

CROSS-REFERENCE TO RELATED APPLICATION

This application is based upon and claims the benefit of priority of the prior Japanese Patent Application No. 2013-005798, filed on Jan. 16, 2013, the entire contents of which are incorporated herein by reference.

FIELD

The embodiment discussed herein is related to a communication monitor, a prediction method, and a recording medium.

BACKGROUND

A communication monitor that predicts the degrees of importance of alarms developing in a network is known as an operational management system for a network. The communication monitor uniformly manages the alarms with linking the alarms to the alarm types and the alarm importance degrees of in a table, for example, an alarm 1 is linked to a severe failure and an alarm 2 is linked to a mild failure. Thus, when the alarm type is the alarm 1, the communication monitor refers to the table so as to determine the alarm importance degree corresponding to the alarm 1, for example, the severe failure. When the alarm importance degree has been determined as a severe failure, the communication monitor notifies the alarm to the user depending on the alarm importance degree.

Patent Document 1: Japanese Laid-open Patent Publication No. 2009-10438

Patent Document 2: Japanese Laid-open Patent Publication No. 2005-285040

However, the communication monitor fixedly manages the alarm type that identifies the contents of the alarm and the alarm importance degree that identifies the degree of importance of the alarm with uniformly linking the alarm type to the alarm importance degree. Thus, even when an alarm actually has a low alarm importance degree, referring to the table causes the alarm to be notified to the user as an alarm having a high alarm importance. For example, when a congestion failure is caused by a large variation of traffic, changing the path just post the occurrence of the congestion failure gets the traffic back to normal, for example, the traffic immediately recovers from the congestion failure. In such a case, the congestion failure does not necessarily affect the service. Thus, it can also be said that it is not necessary to notify an alarm to the user.

SUMMARY

According to an aspect of an embodiment, a communication monitor includes a generation unit that generates alarm path change information including path change information when a path is changed and an alarm developing when the path is changed in a network. The communication monitor includes a search unit that searches alarm path change information corresponding to a new alarm when the alarm is received. The communication monitor includes a prediction unit that predicts a traffic amount in a post-change path based on a traffic amount in a pre-change path in the alarm path change information searched in the search unit. The communication monitor includes a calculation unit that calculates a criticality degree in the network based on a ratio of the traffic amount in the post-change path predicted in the prediction unit, the ratio of the traffic amount exceeding a predetermined allowable amount. Further, the communication monitor includes a determination unit that determines an alarm importance degree of the received alarm corresponding to an influence degree based on the criticality degree calculated in the calculation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory diagram of an exemplary link table;

FIG. 6 is an explanatory diagram of an exemplary path table;

FIG. 17 is an explanatory diagram of an exemplary table of the traffic used by the users;

FIG. 18 is an explanatory diagram of an exemplary path traffic amount table;

DESCRIPTION OF EMBODIMENT

Preferred embodiment of the present invention will be explained with reference to accompanying drawings. Note that the disclosed technique is not limited to the embodiment.

Figure 1:
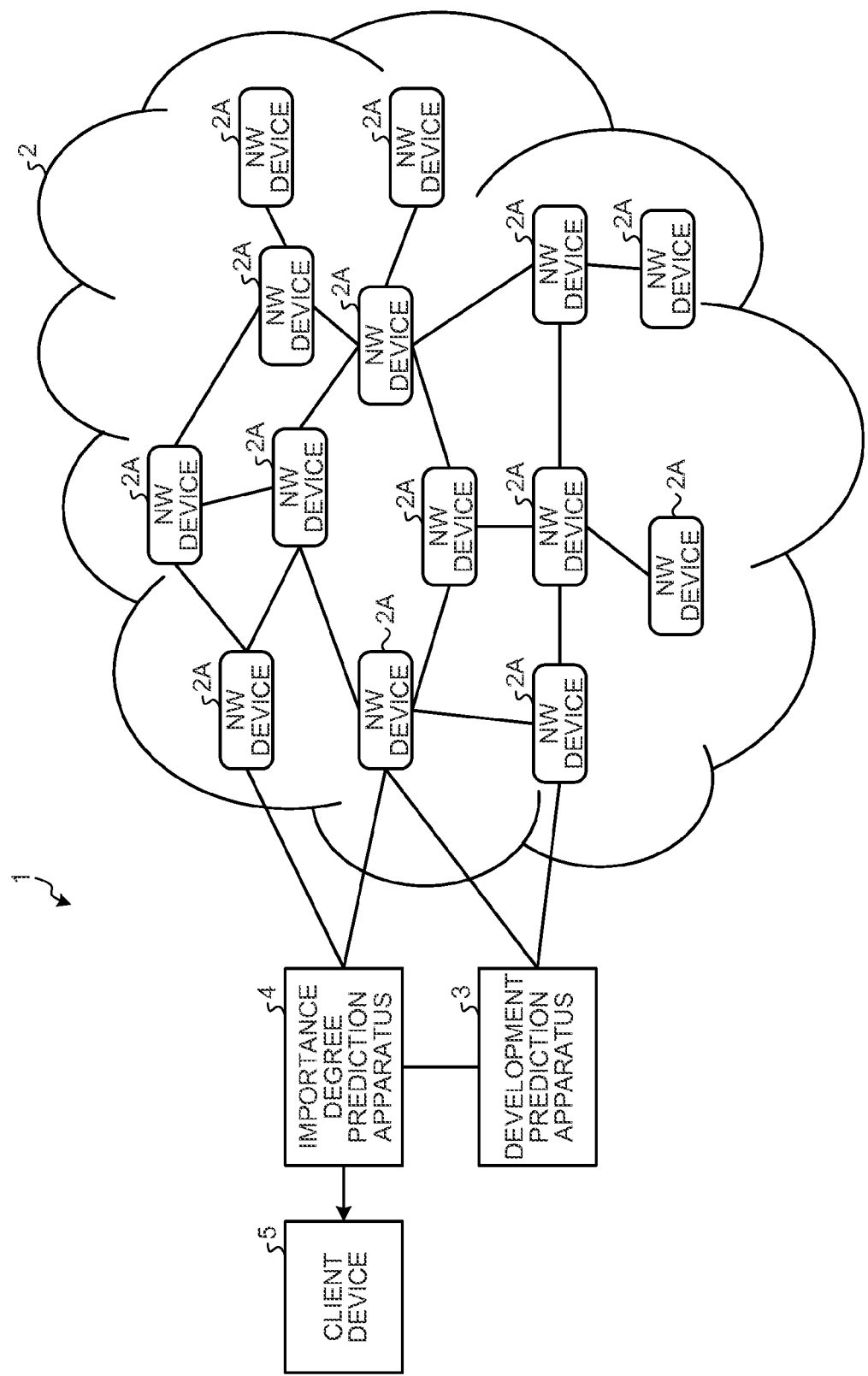
FIG. 1 is an explanatory diagram of an exemplary operational management system in the present embodiment.

FIG. 1 is an explanatory diagram of an exemplary operational management system in the present embodiment. An operational management system 1 includes a network 2 to which a plurality of network devices (hereinafter, merely referred to as NW devices) 2A is connected, a development prediction apparatus 3, an importance degree prediction apparatus 4, and a client device 5. The development prediction apparatus 3 monitors the communication situation in the network 2 so as to predict a failure, namely, a development of an alarm based on the monitoring result. Then, the development prediction apparatus 3 notifies the development of the alarm that is a monitoring result to the client device 5 and the importance degree prediction apparatus 4. The importance degree prediction apparatus 4 predicts the degree of importance of the alarm generating in the network 2 based on the previous path change. The importance degree prediction apparatus 4 notifies the alarm importance degree that is a prediction result to the development prediction apparatus 3 and the client device 5.

Figure 2:
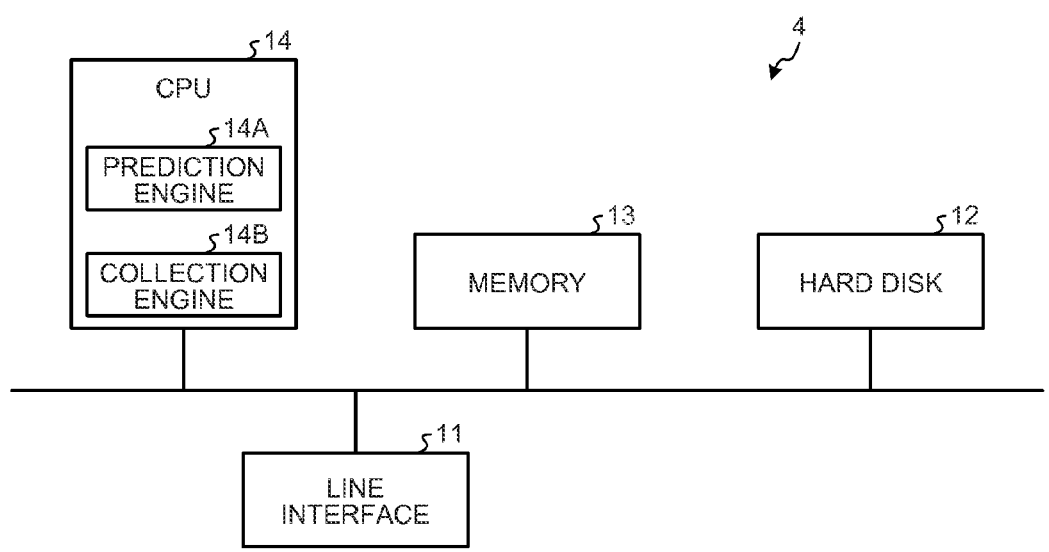
FIG. 2 is a block diagram of an exemplary importance degree prediction apparatus.

FIG. 2 is a block diagram of an example of the importance degree prediction apparatus 4. The importance degree prediction apparatus 4 includes a line interface 11, a hard disk 12, a memory 13, and a Central Processing Unit (CPU) 14. The line interface 11 is configured to collect various types of information from the NW devices 2A or a management device in the network 2. The hard disk 12 is a region that stores the information used to operate a prediction engine 14A, a collection engine 14B, and the like to be described below as well as the various types of information collected from the NW devices 2A and various programs of the prediction engine 14A, the collection engine 14B, and the like. The memory 13 is a region that stores the various types of information.

The CPU 14 controls the whole of the importance degree prediction apparatus 4. The CPU 14 executes the prediction engine 14A or the collection engine 14B stored in the hard disk 12 as a process. The collection engine 14B is a program that collects the information for detecting a path change, the information on the currently generating alarm, or the quality information from the NW devices 2A and the management device through the line interface 11. The prediction engine 14A calculates the degree of criticality of the network to be described below based on the alarm name notified from the development prediction apparatus 3 and the information collected in the collection engine 14B. The prediction engine 14A further determines the degree of importance of the alarm based on the calculated network criticality degree, the data importance degree and the important data flow degree to be described below.

Figure 3:
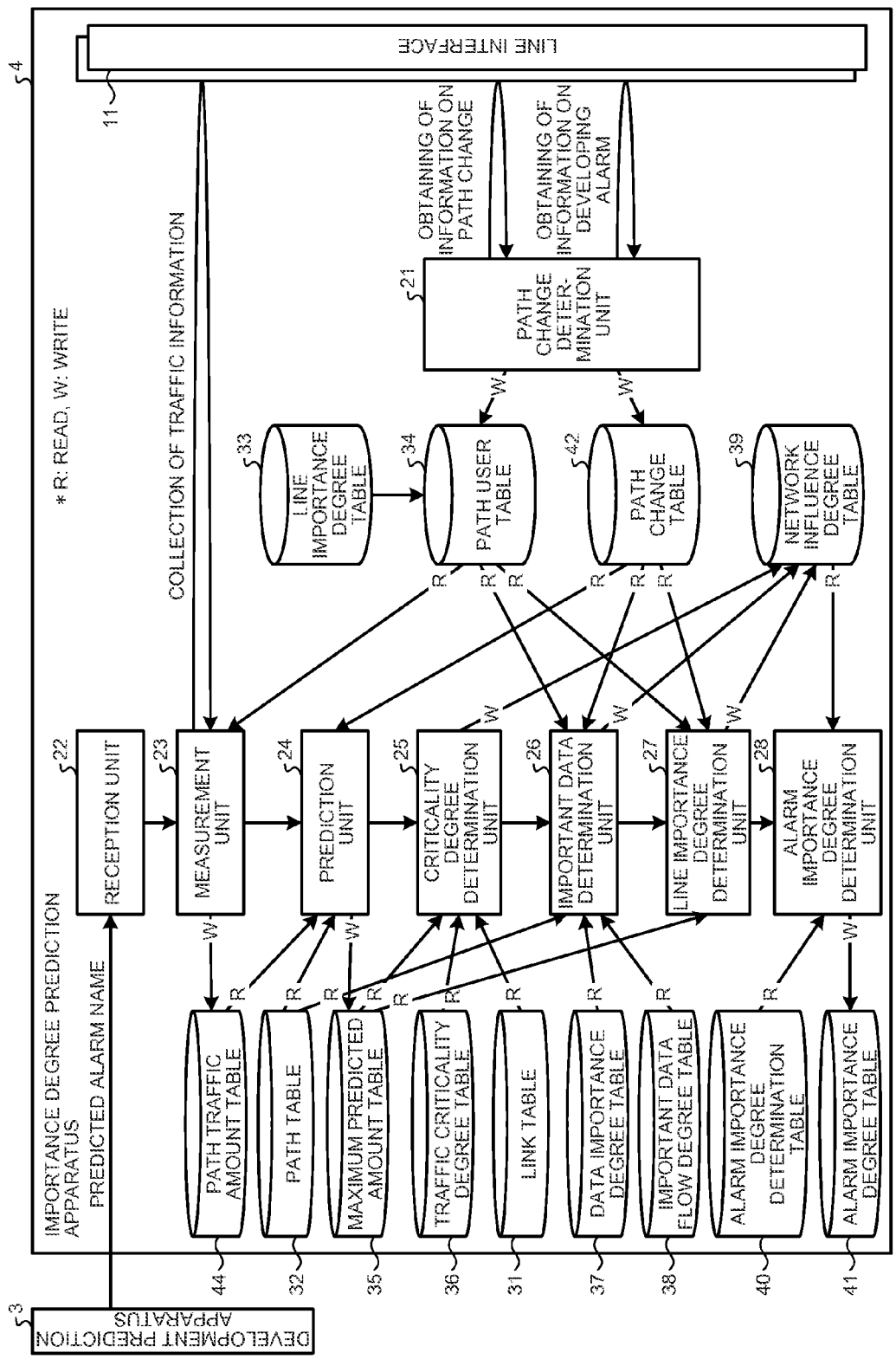
FIG. 3 is a functional block diagram of an exemplary importance degree prediction apparatus.

FIG. 3 is a functional block diagram of an example of the importance degree prediction apparatus 4. The CPU 14 includes a path change determination unit 21, a reception unit 22, a measurement unit 23, a prediction unit 24, a criticality degree determination unit 25, an important data determination unit 26, a line importance degree determination unit 27, and an alarm importance degree determination unit 28. Note that the processing functions of the path change determination unit 21, the reception unit 22, the measurement unit 23, the prediction unit 24, the criticality degree determination unit 25, the important data determination unit 26, the line importance degree determination unit 27, and the alarm importance degree determination unit 28 are executed as processes. The memory 13 includes a link table 31, a path table 32, a line importance degree table 33, a path user table 34, and a maximum predicted amount table 35. The memory 13 further includes a traffic criticality degree table 36, a data importance degree table 37, an important data flow degree table 38, a network influence degree table 39, and an alarm importance degree determination table 40. The memory 13 further includes an alarm importance degree table 41, a path change table 42, a user using traffic amount table 43, and a path traffic amount table 44.

The path change determination unit 21 is, for example, a generation unit that collects the information capable of detecting a path change in the network 2 and, when detecting a path change, collects the currently used path and the generating alarm so as to store them as the alarm path change information in the path change table 42. Note that the method in which the path change determination unit 21 detects a path change or detects a generating alarm can appropriately be changed. For example, there are a method in which the path or the alarm is collected from the management device or the like that manages them and a method in which the information is collected from the NW devices 2A.

The reception unit 22 is, for example, a search unit that receives the name of the alarm predicted with the development prediction apparatus 3 so as to search the alarm path change information base on the received alarm name. The reception unit 22 further determines whether the alarm importance degree can be predicted based on the result from the search of the alarm path change information, namely, the presence or absence of the record of the alarm path change information. When the alarm importance degree can be predicted, the reception unit 22 calls the measurement unit 23 in order to start predicting the alarm importance degree. On the other hand, when it is difficult to predict the alarm importance degree, the reception unit 22 determines the alarm importance degree corresponding to the alarm type in a similar manner to the system in the past.

The measurement unit 23 measures the traffic amount currently flowing through each link in the paths so as to calculate the traffic amounts in each path based on the measurement results so as to store the traffic amounts in each path in the path traffic amount table 44.

The prediction unit 24 predicts the variation of the traffic amount when a path change occurs so as to store the maximum predicted amount information including the maximum predicted traffic amount and the link name in the maximum predicted amount table 35.

The criticality degree determination unit 25 is, for example, a calculation unit that calculates a traffic excess degree that is a ratio in which the maximum predicted traffic amount of the link in the maximum predicted amount information predicted with the prediction unit 24 exceeds the maximum traffic amount of the link. Note that the maximum traffic amount is the normal maximum allowable traffic amount in the link. The criticality degree determination unit 25 refers to the traffic criticality degree table 36 so as to determine the traffic criticality degree according to the traffic excess degree. The criticality degree determination unit 25 further stores the determined traffic criticality degree in the network influence degree table 39.

The important data determination unit 26 is, for example, a flow degree calculation unit that calculates the ratio of important data flowing through the link affected by a path change to the traffic amount, namely, the ratio of flow of the important data. Note that the link affected by the path change is the link of the path in which the path change has occurred and the link predicted with the prediction unit 24. The important data determination unit 26 refers to the important data flow degree table 38 so as to determine the important data flow degree according to the flow ratio of the important data. The important data determination unit 26 stores the determined important data flow degree in the network influence degree table 39.

The line importance degree determination unit 27 is, for example, a line importance degree determination unit that determines the line importance degree of the path affected by a path change so as to store the line importance degree that is the determination result in the network influence degree table 39. Note that the link affected by the path change is the link of the path in which the path change occurs and the link predicted with the prediction unit 24.

The alarm importance degree determination unit 28 calculates a network influence degree based on the traffic criticality degree determined in the criticality degree determination unit 25, the important data flow degree determined in the important data determination unit 26, the line importance degree determined in the line importance degree determination unit 27, and the like. The alarm importance degree determination unit 28 is, for example, a determination unit that refers to the alarm importance degree determination table 40 so as to determine the alarm importance degree according to the network influence degree. The alarm importance degree determination unit 28 links the determined alarm importance degree, the device in which the alarm has developed, and the alarm name to each other so as to store them as the alarm importance degree prediction information in the alarm importance degree table 41.

Figure 4:
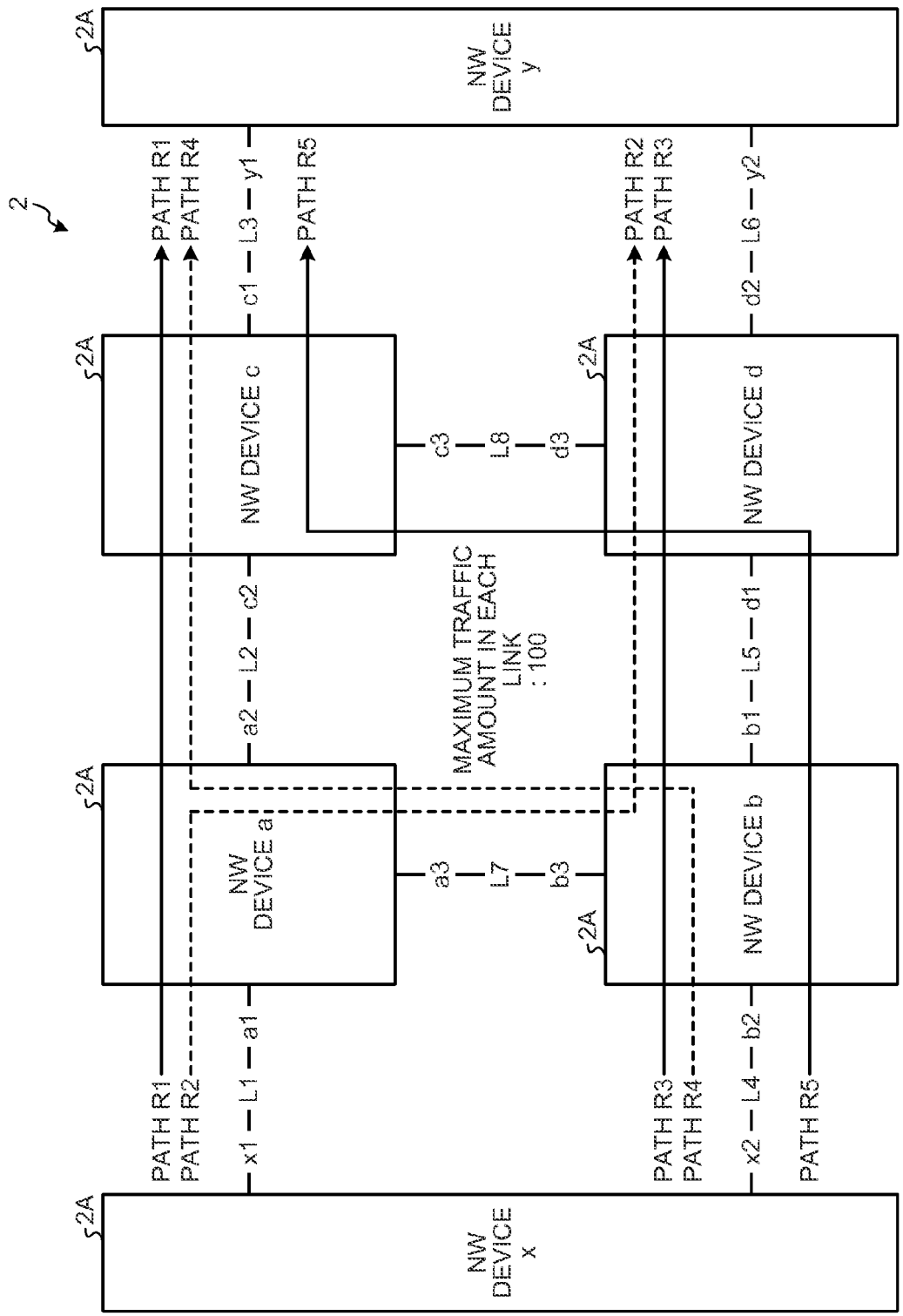
FIG. 4 is an explanatory diagram of an exemplary configuration of the paths and links of NW devices in a network monitored with the importance degree prediction apparatus.

FIG. 4 is an explanatory diagram of exemplary configuration of the paths and links of the NW devices 2A in the network 2 monitored with the importance degree prediction apparatus 4. For the sake of convenience for the description, the network 2 illustrated in FIG. 4 includes, for example, an NW device 2A denoted with "x", an NW device 2A denoted with "a", an NW device 2A denoted with "b", an NW device 2A denoted with "c", an NW device 2A denoted with "d", and an NW device 2A denoted with "y".

Paths R in the network 2 include, for example, five paths R1 to R5. The path R1 is a path of the NW devices 2A from the NW device 2A of "x" through the NW device 2A of "a" and the NW device 2A of "c" to the NW device 2A of "y." The path R2 is a path of the NW devices 2A from the NW device 2A of "x" through the NW device 2A of "a", the NW device 2A of "b", and the NW device 2A of "d" to the NW device 2A of "y." The path R3 is a path of the NW devices 2A from the NW device 2A of "x" through the NW device 2A of "b" and the NW device 2A of "d" to the NW device 2A of "y." The path R4 is a path of the NW devices 2A from the NW device 2A of "x" through the NW device 2A of "b", the NW device 2A of "a", and the NW device 2A of "c" to the NW device 2A of "y." The path R5 is a path of the NW devices 2A from the NW device 2A of "x" through the NW device 2A of "b", the NW device 2A of "d", and the NW device 2A of "c" to the NW device 2A of "y."

Links L in the path R include, for example, eight links L1 to L8. The link L1 is a link between a port "x1" of the NW device 2A of "x" and a port "a1" of the NW device 2A of "a". The link L2 is a link between a port "a2" of the NW device 2A of "a" and a port "c2" of the NW device 2A of "c". The link L3 is a link between a port "c1" of the NW device 2A of "c" and a port "y1" of the NW device 2A of "y". The link L4 is a link between a port "x2" of the NW device 2A of "x" and a port "b2" of the NW device 2A of "b". The link L5 is a link between a port "b1" of the NW device 2A of "b" and a port "d1" of the NW device 2A of "d". The link L6 is a link between a port "d2" of the NW device 2A of "d" and a port "y2" of the NW device 2A of "y". The link L7 is a link between a port "a3" of the NW device 2A of "a" and a port "b3" of the NW device 2A of "b". The link L8 is a link between a port "c3" of the NW device 2A of "c" and a port "d3" of the NW device 2A of "d". Each of the links L1 to L8 has the maximum traffic, for example, of 100 bps.

FIG. 5 is an explanatory diagram of an example of the link table 31. The link table 31 illustrated in FIG. 5 manages, per link, the information on the NW devices 2A using of the link. The link table 31 links a link name 31A, a device name 31B, a port name 31C, a device name 31D, a port name 31E, and a maximum traffic amount 31F to each other so as to manage them per link. The link name 31A identifies a link. The device name 31B identifies an NW device 2A to be used. The port name 31C identifies a port to be used at the NW device 2A. The device name 31D is the name of the port of a destination NW device 2A. The port name 31E is the port name of a destination NW device 2A. The maximum traffic amount is the allowable maximum amount of the traffic flowing through the link. The contents of the link table 31 are previously set based on the network 2 illustrated in FIG. 4. For example, the CPU 14 can identify that the link L4 has the maximum traffic amount of 100 bps using the facts that the port of the NW device 2A of "x" is the port "x2" and that the port of the NW device 2A of "b" is the port "b2" with reference to the link table 31.

FIG. 6 is an explanatory diagram of an example of the path table 32. The path table 32 illustrated in FIG. 6 lists links 36B (L) used on each path 32A (R). The link L to be used in the path R is denoted with "1" and the link L that has not been determined to use is denoted with a blank. Note that the contents of the path table 32 are previously set based on the network 2 illustrated in FIG. 4. For example, the CPU 14 can identify that the links L1 to L3 are currently used and the links L4 to L8 are not used in the path R1 with reference to the path table 32.

Figure 7:
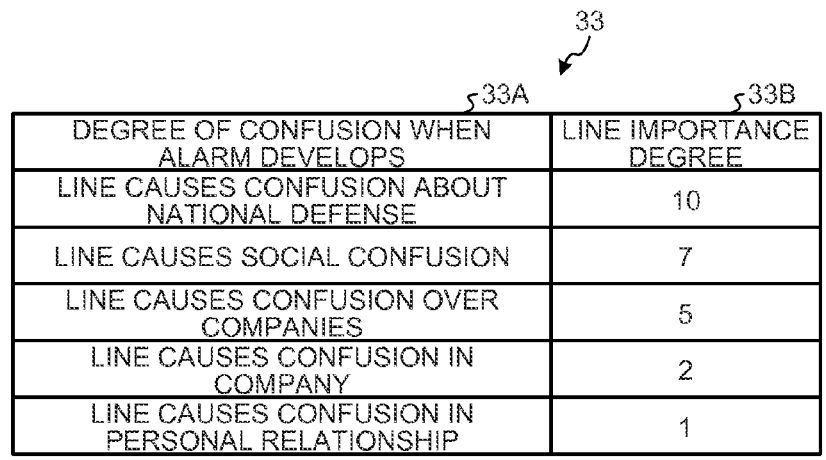
FIG. 7 is an explanatory diagram of an exemplary line importance degree table.

FIG. 7 is an explanatory diagram of an example of the line importance degree table 33. The line importance degree table 33 illustrated in FIG. 7 manages line importance degrees 33B according to confusion degrees 33A when an alarm develops. When the confusion degree 33A of a line causes confusion about the national defense, the line importance degree 33B of the line is "10". When the confusion degree 33A of a line causes social confusion, the line importance degree of the line is "7". When the confusion degree 33A of a line causes confusion over a plurality of companies, the line importance degree of the line is "5". When the confusion degree 33A of a line causes confusion in a company, the line importance degree of the line is "2". When the confusion degree 33A of a line causes confusion in a personal relationship, the line importance degree of the line is "1". Note that the contents of the line importance degree table 33 are previously set.

Figure 8:
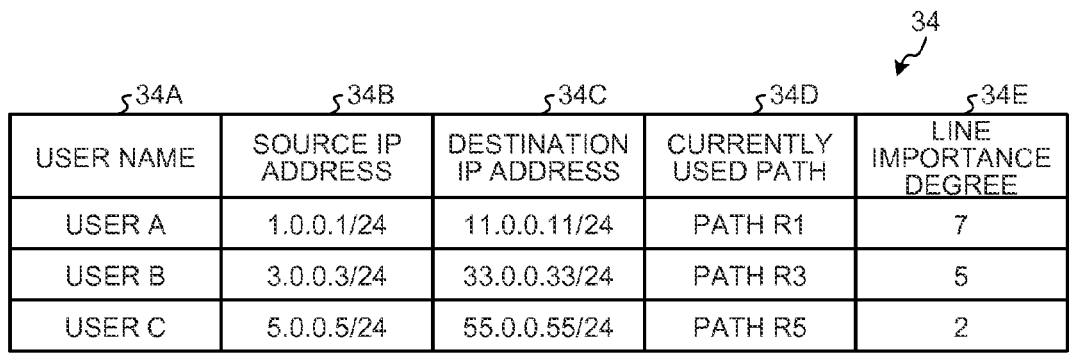
FIG. 8 is an explanatory diagram of an exemplary path user table.

FIG. 8 is an explanatory diagram of an example of the path user table 34. The path user table 34 illustrated in FIG. 8 links a user name 34A identifying the user, a source IP address 34B, a destination IP address 34C, a currently used path 34D, and a line importance degree 34E to each other so as to manage them. Note that the contents of the path user table 34 are previously set. The CPU 14 refers to the path user table 34 so as to determine, for example, that the currently used path 34D of a "user A" is the "R1" and the line importance degree 34E is "7" as well as the source IP address and the destination IP address.

Figure 9:
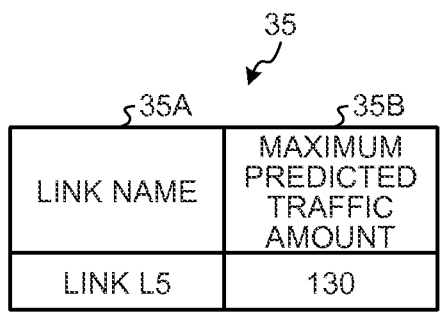
FIG. 9 is an explanatory diagram of an exemplary maximum predicted amount table.

FIG. 9 is an explanatory diagram of an example of the maximum predicted amount table 35. The maximum predicted amount table 35 illustrated in FIG. 9 manages maximum predicted amount information, namely, a maximum predicted traffic amount 35B and a link name 35A of the maximum predicted traffic amount. The CPU 14 can identify that the maximum predicted traffic amount is "130" in the current network 2 and the link having the maximum predicted traffic amount is the link L5 with reference to the maximum predicted amount table 35.

Figure 10:
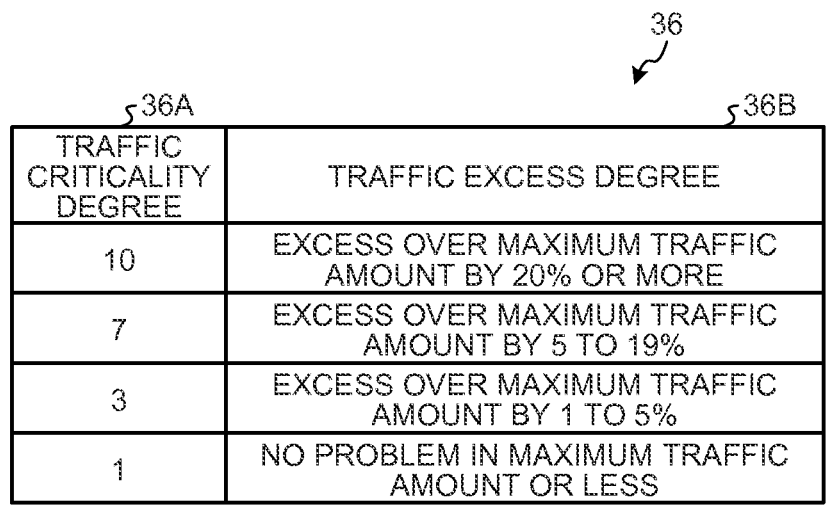
FIG. 10 is an explanatory diagram of an exemplary traffic criticality degree table.

FIG. 10 is an explanatory diagram of an example of the traffic criticality degree table 36. The traffic criticality degree table 36 illustrated in FIG. 10 manages a traffic criticality degree 36A according to a traffic excess degree 36B per link. Note that the CPU 14 calculates the traffic excess degree based on the maximum traffic amount that is the allowable maximum flow through the link. For example, when the traffic excess degree 36B exceeds the maximum traffic amount by 20% or more, the traffic criticality degree 36A is "10". When the traffic excess degree 36B exceeds the maximum traffic amount by 5 to 19%, the traffic criticality degree 36A is "7". When the traffic excess degree 36B exceeds the maximum traffic amount by 1 to 5%, the traffic criticality degree 36A is "3". When the traffic excess degree 36B is equal to or lower than the maximum traffic amount, the traffic criticality degree 36A is "1". Note that the contents of the traffic criticality degree table 36 are previously set.

Figure 11:
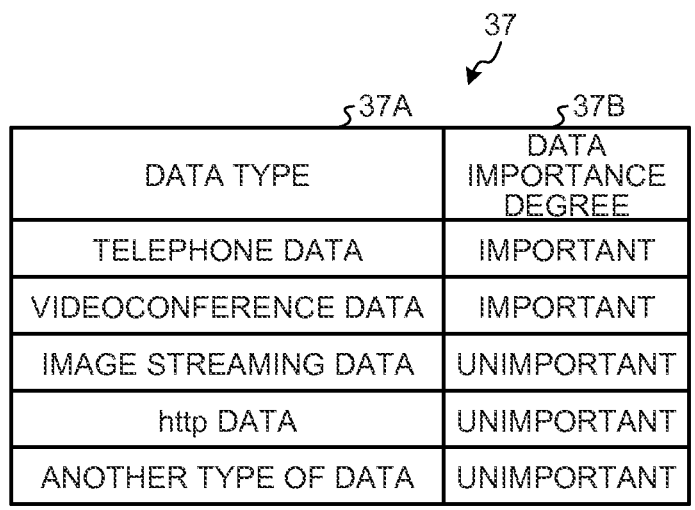
FIG. 11 is an explanatory diagram of an exemplary data importance degree table.

FIG. 11 is an explanatory diagram of an example of the data importance degree table 37. The data importance degree table 37 illustrated in FIG. 11 links a data type 37A flowing through a path to a data importance degree 37B so as to manage them. For example, when the data type 37A is telephone data or videoconference data, the data importance degree 37B is "important". When the data type 37A is image streaming data, http data, or another type of data, the data importance degree 37B is "unimportant". Note that the contents of the data importance degree table 37 are previously set.

Figure 12:
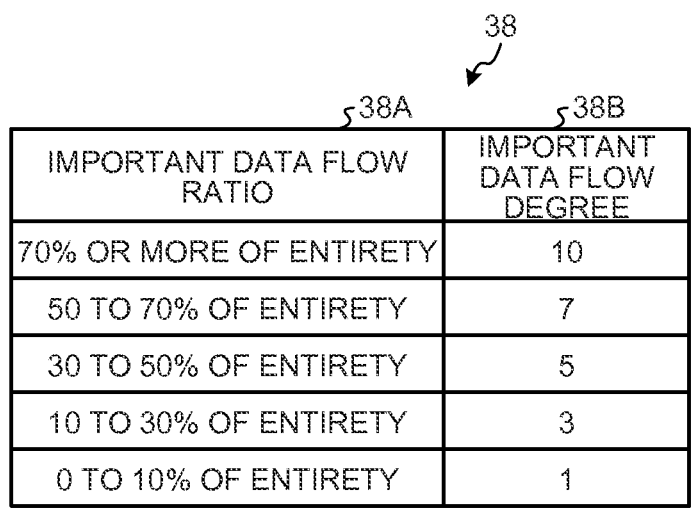
FIG. 12 is an explanatory diagram of an exemplary important data flow degree table.

FIG. 12 is an explanatory diagram of an example of the important data flow degree table 38. The important data flow degree table 38 illustrated in FIG. 12 links an important data flow ratio 38A to an important data flow degree 38B so as to manage them. Note that the CPU 14 calculates the ratio of the important data in the traffic flowing on a link as the important data flow ratio 38A. For example, when the important data flow degree 38B accounts for 70% or more of the entire traffic amount, the important data flow degree 38B is "10". When the important data flow ratio 38A accounts for 50 to 70% of the entire traffic amount, the important data flow degree 38B is "7". When the important data flow ratio 38A accounts for 30 to 50% of the entire traffic amount, the important data flow degree 38B is "5". When the important data flow ratio 38A accounts for 10 to 30% of the entire traffic amount, the important data flow degree 38B is "3". When the important data flow ratio 38A accounts for 0 to 10% of the entire traffic amount, the important data flow degree 38B is "1". Note that the contents of the important data flow degree table 38 are previously set.

Figure 13:
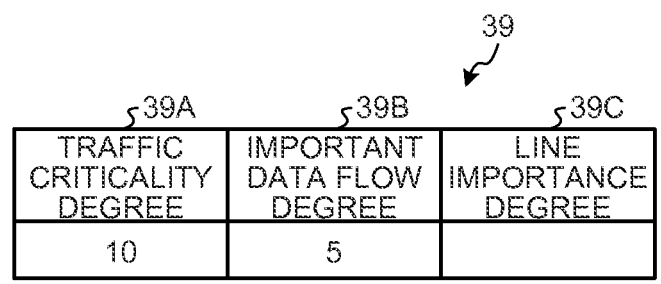
FIG. 13 is an explanatory diagram of an exemplary network influence degree table.

FIG. 13 is an explanatory diagram of an example of the network influence degree table 39. The network influence degree table 39 illustrated in FIG. 13 links a traffic criticality degree 39A, an important data flow degree 39B, and a line importance degree 39C to each other so as to manage them. Note that, as to be described below, the CPU 14 calculates an influence degree based on the traffic criticality degree 39A, the important data flow degree 39B, and the line importance degree 39C.

Figure 14:
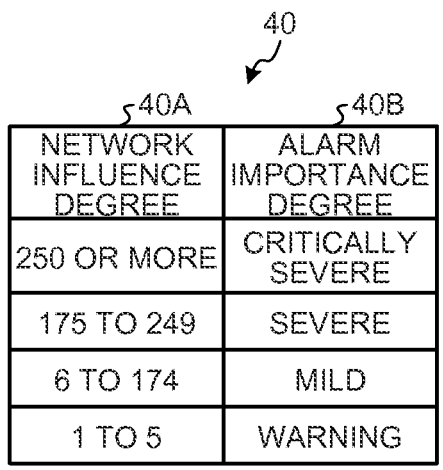
FIG. 14 is an explanatory diagram of an exemplary alarm importance degree determination table.

FIG. 14 is an explanatory diagram of an example of the alarm importance degree determination table 40. The alarm importance degree determination table 40 illustrated in FIG. 14 links a network influence degree 40A to an alarm importance degree 40B so as to manage them. For example, when the influence degree 40A is 250 or more, the alarm importance degree 40B is "critically severe". When the influence degree 40A is 175 to 249, the alarm importance degree 40B is "severe". When the influence degree 40A is 6 to 174, the alarm importance degree 40B is "mild". When the influence degree 40A is 1 to 5, the alarm importance degree 40B is "warning". Note that the contents of the alarm importance degree determination table 40 are previously set.

Figure 15:
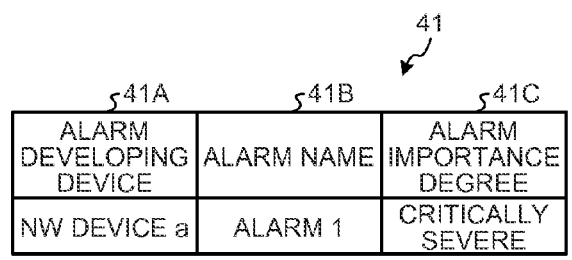
FIG. 15 is an explanatory diagram of an exemplary alarm importance degree table.

FIG. 15 is an explanatory diagram of an example of the alarm importance degree table 41. The alarm importance degree table 41 illustrated in FIG. 15 links an alarm developing device 41A, an alarm name 41B, and an alarm importance degree 41C to each other so as to manage the alarm importance degree prediction information. The CPU 14 can identify that a failure of an "alarm 1" has developed in the NW device 2A of "a" and the alarm importance degree is "critically severe" with reference to the alarm importance degree table 41 in FIG. 15.

Figure 16:
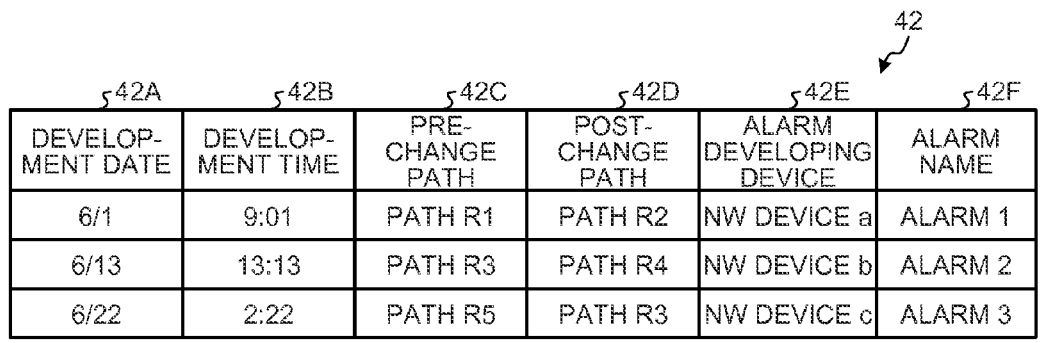
FIG. 16 is an explanatory diagram of an exemplary path change table.

FIG. 16 is an explanatory diagram of an example of the path change table 42. The path change table 42 illustrated in FIG. 16 links a development date 42A, a development time 42B, a pre-change path 42C, a post-change path 42D, an alarm developing device 42E, and an alarm name 42F to each other as the history information when a path change has occurred so as to manage the history information. The development date 42A and the development time 42B are the date and time of occurrence of the path change. The pre-change path 42C is the path before the path change has occurred. The post-change path 42D is the path after the path change has occurred. The alarm developing device 42E is the device name for identifying the NW device 2A in which an alarm develops. The alarm name 42F is the alarm name for identifying the developing alarm. The CPU 14 can identify that the path change from the path R3 to the path R4 has occurred at 13:13 on June 13 and an "alarm 2" has developed in the NW device 2A of "b" that is the alarm developing device with reference to the path change table 42 in FIG. 16.

FIG. 17 is an explanatory diagram of an example of the user using traffic amount table 43. The user using traffic amount table 43 illustrated in FIG. 17 manages the traffic amount per link 43B at each user name 43A. The CPU 14 can identify, for example, the traffic amounts of the link L1, link L2, and link L3 of a user "A" are "59", "60", and "60" with reference to the user using traffic amount table 43 in FIG. 17.

FIG. 18 is an explanatory diagram of an example of the path traffic amount table 44. The path traffic amount table 44 illustrated in FIG. 18 manages the traffic amount per link 44B at each path name 44A for identifying the paths R. The CPU 14 can identify, for example, the traffic amounts of the link L1, link L2, and link L3 of the path R1 are "59", "60", and "60" with reference to the path traffic amount table 44 in FIG. 18.

Figure 19:
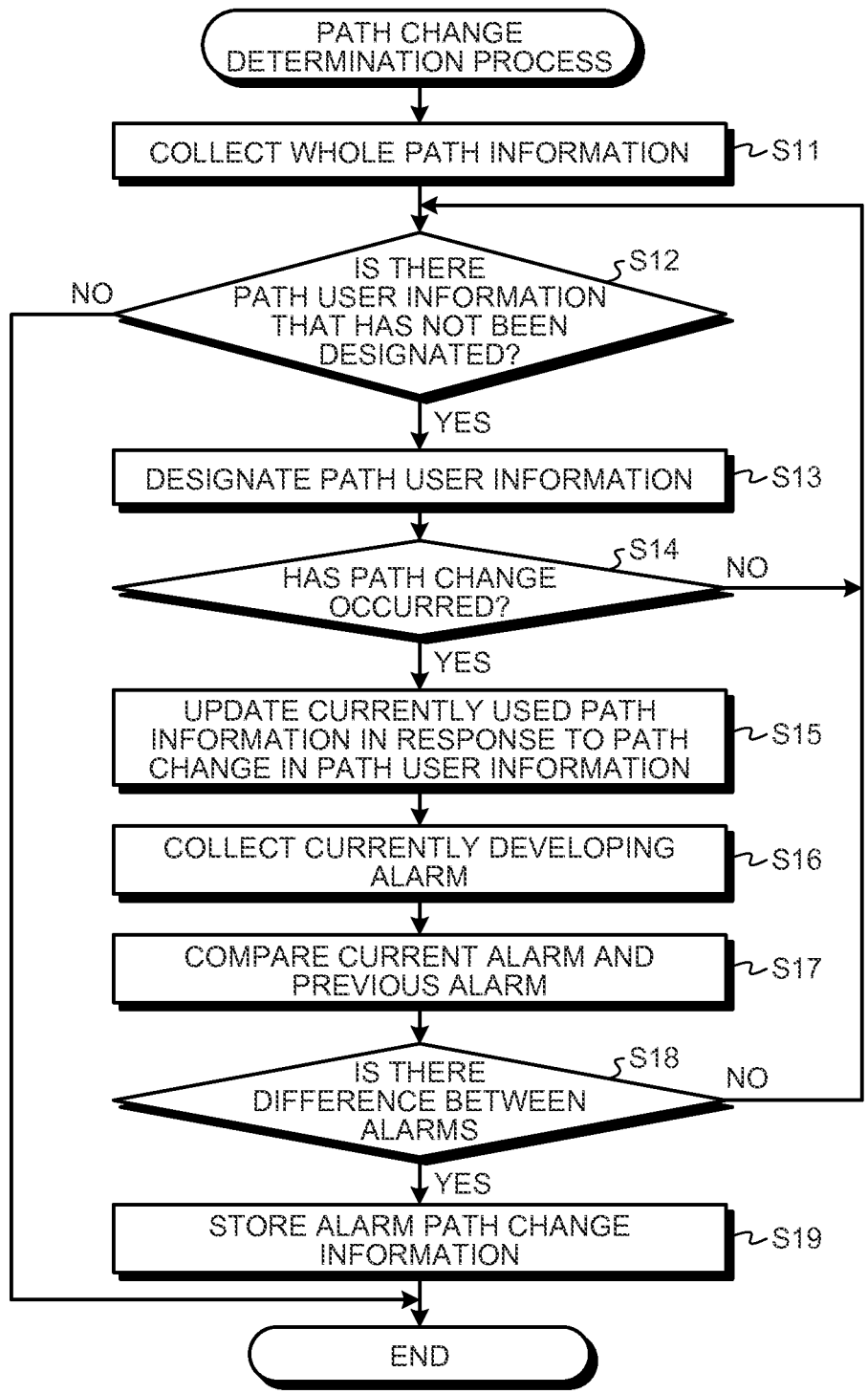
FIG. 19 is a flowchart of exemplary operations in a CPU for a path change determination process.
Figure 20:
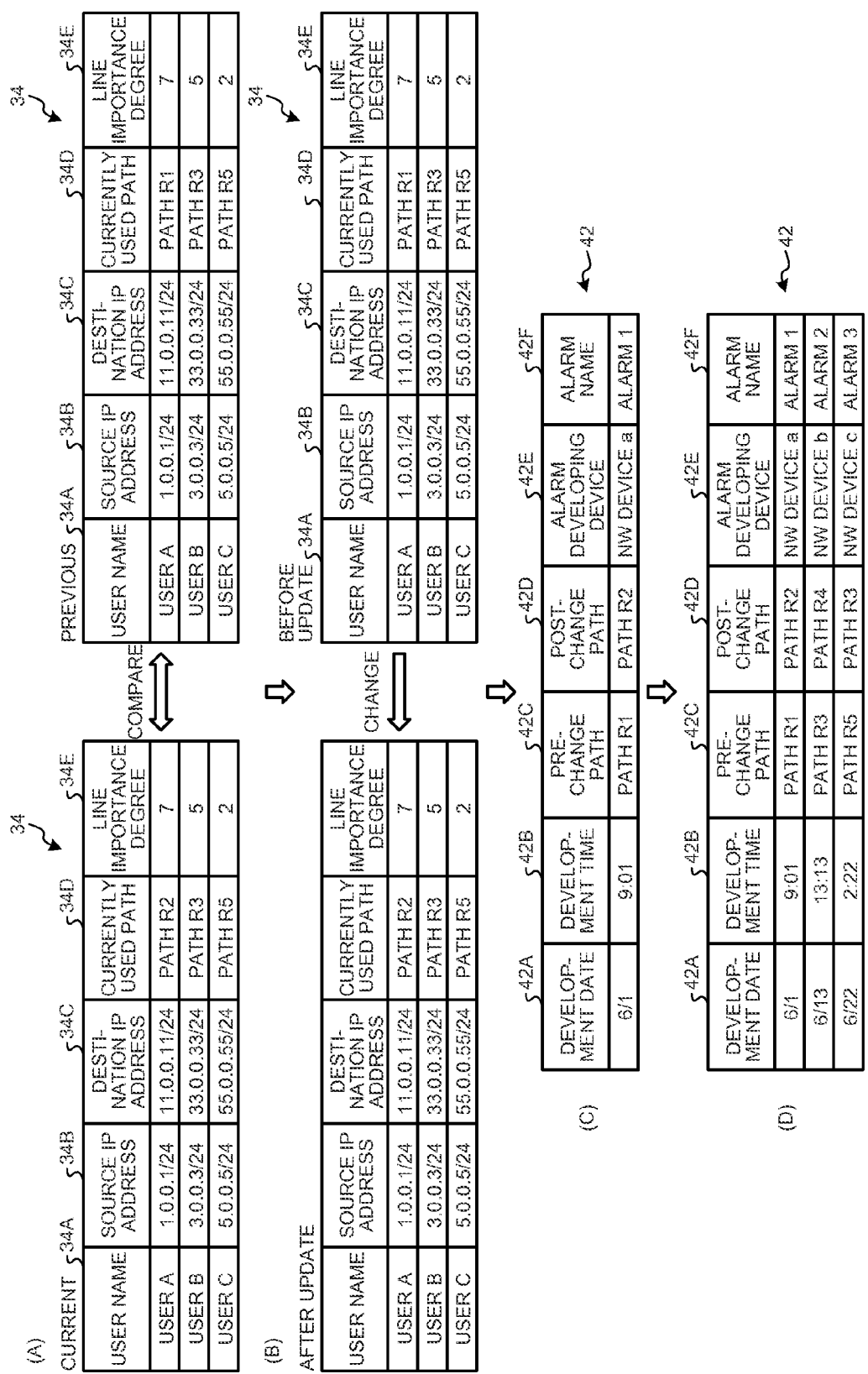
FIG. 20 is an explanatory diagram of the flow of use of the tables for the path change determination process.

Next, the operations of the importance degree prediction apparatus 4 of the present embodiment will be described. First, the operations for a path change determination process in the importance degree prediction apparatus 4 will be described with FIG. 19 and FIG. 20. FIG. 19 is a flowchart of exemplary operations in the CPU 14 for a path change determination process. FIG. 20 is an explanatory diagram of the flow of use of the tables for the path change determination process. The path change determination process illustrated in FIG. 19 is a process in which the path change determination unit 21 generates the alarm path change information based on the path change and the alarm difference in the network 2. Note that the path change determination unit 21 can operate periodically or on demand.

The path change determination unit 21 of the CPU 14 in FIG. 19, for example, collects the whole of the path information in the network 2 from each of the NW devices 2A and the management device (step S11). The path change determination unit 21 determines whether there is path user information that has not been designated (step S12). When there is path user information that has not been designated (Yes in step S12), the path change determination unit 21 designates the path user information (step S13). The path change determination unit 21 determines based on the pre-after variation of the currently used path 34D in the path user information of the path user table 34 whether a path change has occurred as illustrated in (A) of FIG. 20 (step S14). Note that the path change determination unit 21 determines, with reference to the user "A" at (A) in FIG. 20, that the currently used path has been changed from the path "R1" to the path "R2".

For example, a method in which a path change is collected from the management device that grasps all of the path changes is a method for collecting a path change. As a method for collecting a path change, the information from which the paths are ascertained, for example, routing information is directly collected from each of the NW devices 2A so as to compare the currently used path to the previously used path based on the source IP address and the destination IP address so as to collect the path change based on the comparison result. As another method for collecting a path change, the data flowing through each link, for example, of a probe device can be captured so as to compare the currently used path to the previously used path so as to collect the path change based on the comparison result.

When a path change has occurred (Yes in step S14), the path change determination unit 21 updates the currently used path 34D according to the path change in the path user information of the path user table 34 as illustrated in (B) of FIG. 20 (step S15). The path change determination unit 21 collects the currently developing alarm (step S16). Note that, for example, information is collected from the management device that manages the currently developing alarm, or the alarm information is directly collected from the NW devices 2A as a method for collecting the currently developing alarm information. The path change determination unit 21 compares the current alarm and the previous alarm (step S17).

The path change determination unit 21 determines whether there is difference between the alarms (step S18). When there is difference between the alarms (Yes in step S18), the path change determination unit 21 generates alarm path change information as illustrated in (C) of FIG. 20 so as to store the alarm path change information in the path change table 42 (step S19) so as to complete the process illustrated in FIG. 19. Note that, when there is a plurality of pieces of alarm path change information, the path change table 42 stores the pieces of alarm path change information as illustrated in (D) of FIG. 20.

When there is not path user information that has not been designated (No in step S12), the path change determination unit 21 completes the process illustrated in FIG. 19. When a path change has not occurred (No in step S14), the path change determination unit 21 returns to the operation in step S12 in order to determine whether there is path user information that has not been designated. When there is not difference between the alarms (No in step S18), the path change determination unit 21 returns to the operation in step S12 in order to determine whether there is path user information that has not been designated. In other words, when there is not difference between the alarms, the path change determination unit 21 does not store the alarm path change information in the path change table 42.

In the path change determination process illustrated in FIG. 19, a path change is detected and, when an alarm currently develops, alarm path change information is generated based on the path change and the alarm such that the alarm path change information is stored in the path change table 42. As a result, the CPU 14 can recognize the alarm developing date and time, the alarm developing device, the alarm name, the pre-change path and the post-change path based on the alarm path change information.

Figure 21:
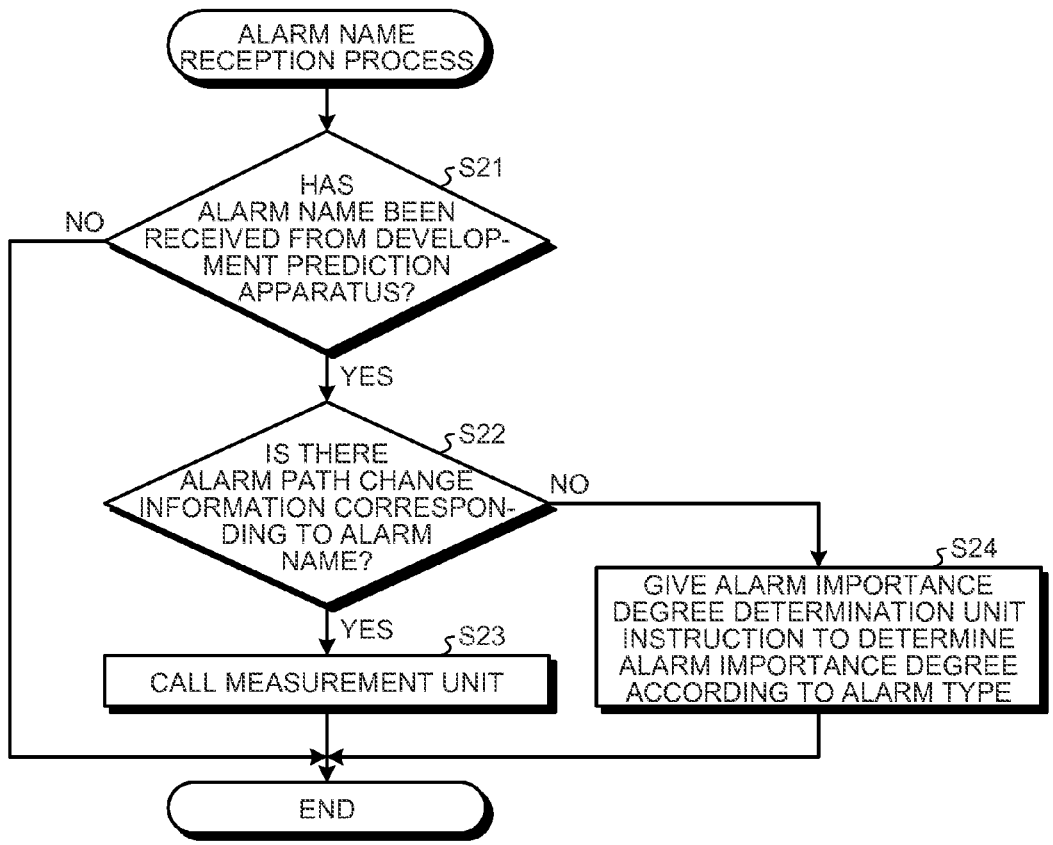
FIG. 21 is a flowchart of exemplary operations in the CPU for an alarm name reception process.

Next, the operations for an alarm name reception process will be described. FIG. 21 is a flowchart of exemplary operations in the CPU 14 for an alarm name reception process. The alarm name reception process illustrated in FIG. 21 is a process in which the reception unit 22 searches the alarm path change information corresponding to the alarm name from the development prediction apparatus 3.

In FIG. 21, the reception unit 22 of the CPU 14 determines whether the reception unit 22 has received an alarm name from the development prediction apparatus 3 (step S21). When having received an alarm name (Yes in step S21), the reception unit 22 determines whether there is the alarm path change information corresponding to the alarm name 42F in the path change table 42 (step S22).

When there is the alarm path change information corresponding to the alarm name (Yes in step S22), the reception unit 22 determines that the alarm importance degree can be predicted. Then, the reception unit 22 calls the measurement unit 23 (step S23) and completes the process illustrated in FIG. 21. When not having received an alarm name (No in step S21), the reception unit 22 determines that it is difficult to predict the alarm importance degree and completes the process illustrated in FIG. 21.

When there is not the alarm path change information corresponding to the alarm name (No in step S22), the reception unit 22 gives the alarm importance degree determination unit 28 an instruction to determine the alarm importance degree corresponding to the alarm type (step S24) and then completes the process illustrated in FIG. 21. Note that, although the reception unit 22 directly receives the predicted alarm name from the development prediction apparatus 3 in the example, the reception unit 22, for example, periodically checks the region to which an alarm name is stored from the development prediction apparatus 3 so as to obtain the alarm name when the alarm name is stored.

In the alarm name reception process illustrated in FIG. 21, the alarm name is received from the development prediction apparatus 3 and, when there is the alarm path change information corresponding to the alarm name, it is determined that the alarm importance degree can be predicted and the measurement unit 23 is activated. When there is not the alarm path change information corresponding to the alarm name, it is determined that it is difficult to predict the alarm importance degree in the alarm name reception process.

Figure 22:
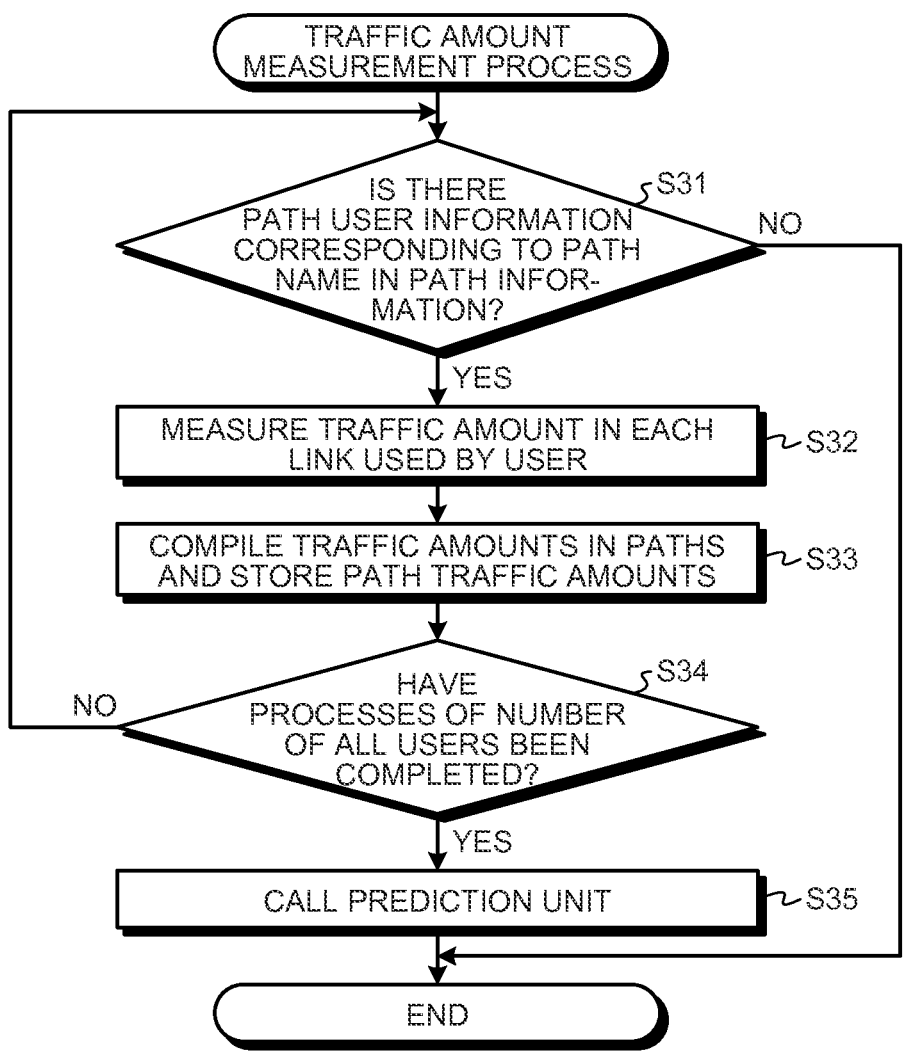
FIG. 22 is a flowchart of exemplary operations in the CPU for a traffic amount measurement process.
Figure 23:
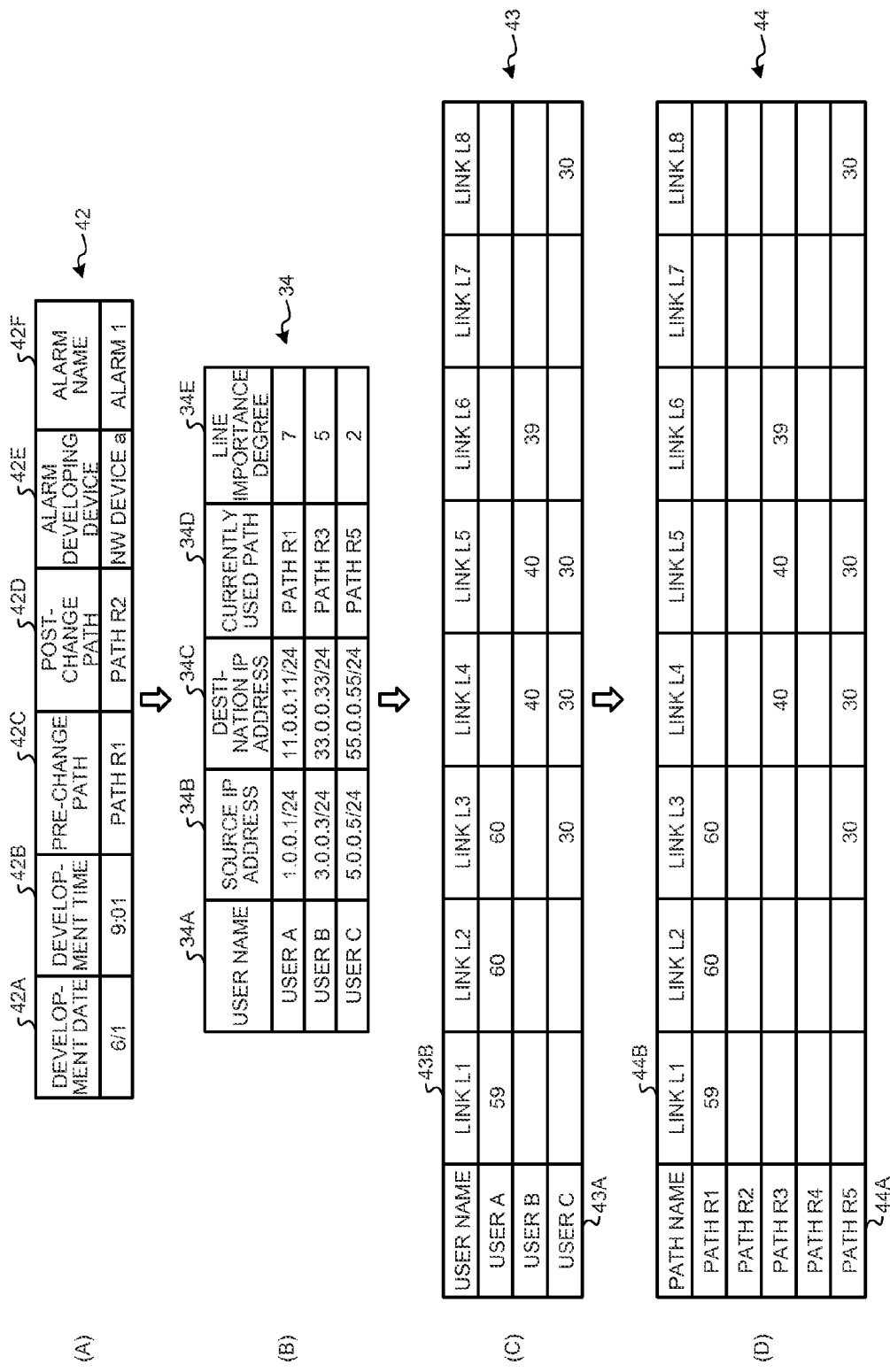
FIG. 23 is an explanatory diagram of the flow of use of the tables for the traffic amount measurement process.

Next, the operations for a traffic amount measurement process will be described with FIG. 22 and FIG. 23. FIG. 22 is a flowchart of exemplary operations in the CPU 14 for a traffic measurement process. FIG. 23 is an explanatory diagram of the flow of use of the tables for the traffic measurement process. The traffic measurement process illustrated in FIG. 22 is a process in which the measurement unit 23 collects the traffic amounts in the links used by each user and adds the traffic amounts of the used links in each path.

In FIG. 22, the measurement unit 23 of the CPU 14 refers to (A) and (B) in FIG. 23 in response to the call from the reception unit 22 so as to determine whether there is path user information corresponding to the path name in the path information (step S31). When there is the path user information corresponding to the path name (Yes in step S31), the measurement unit 23 measures the traffic amount in each link used by the user of the path user information (step S32). Note that the measurement unit 23 stores the traffic amounts at each of the used links of each user in the user using traffic amount table 43 as illustrated in (C) of FIG. 23. When the traffic amounts are measured, the measurement unit 23 collects the traffic amounts from the management device, for example, the probe device so as to measure the traffic amounts. However, the traffic amounts can directly be measured, for example, through each of the NW devices 2A.

The measurement unit 23 stores the path traffic amounts obtained by compiling the traffic amount in each link 44B of each path 44A in the path traffic amount table 44 as illustrated in (D) of FIG. 23 (step S33). Note that the measurement unit 23 refers to the user using traffic amount table 43 so as to sequentially add the traffic amounts each measured per link based on the user name in the path user information and the information on the currently used path so as to store the traffic amounts in the path traffic amount table 44. The measurement unit 23 determines whether the path traffic amounts of all of the users have been compiled (step S34).

When the compilation of the path traffic amounts of all of the users has completed (Yes in step S34), the measurement unit 23 calls the prediction unit 24 (step S35) and completes the process illustrated in FIG. 22. When there is not the path user information corresponding to the path name (No in step S31), the measurement unit 23 completes the process illustrated in FIG. 22. When the compilation of the path traffic amount of all of the users has not completed (No in step S34), the measurement unit 23 returns to step S31.

In the traffic amount measurement illustrated in FIG. 22, the traffic amount per link is measured and the traffic amount of each of the used links by the user is stored in the user using traffic amount table 43. As a result, the CPU 14 can identify the traffic amounts of the used links by the user with reference to the user using traffic amount table 43. Further, in the traffic amount measurement process, the path traffic amounts of all of the users are compiled and stored per path in the path traffic amount table 44. As a result, the CPU 14 can identify the path traffic amounts per path with reference to the path traffic amount table 44.

Figure 24:
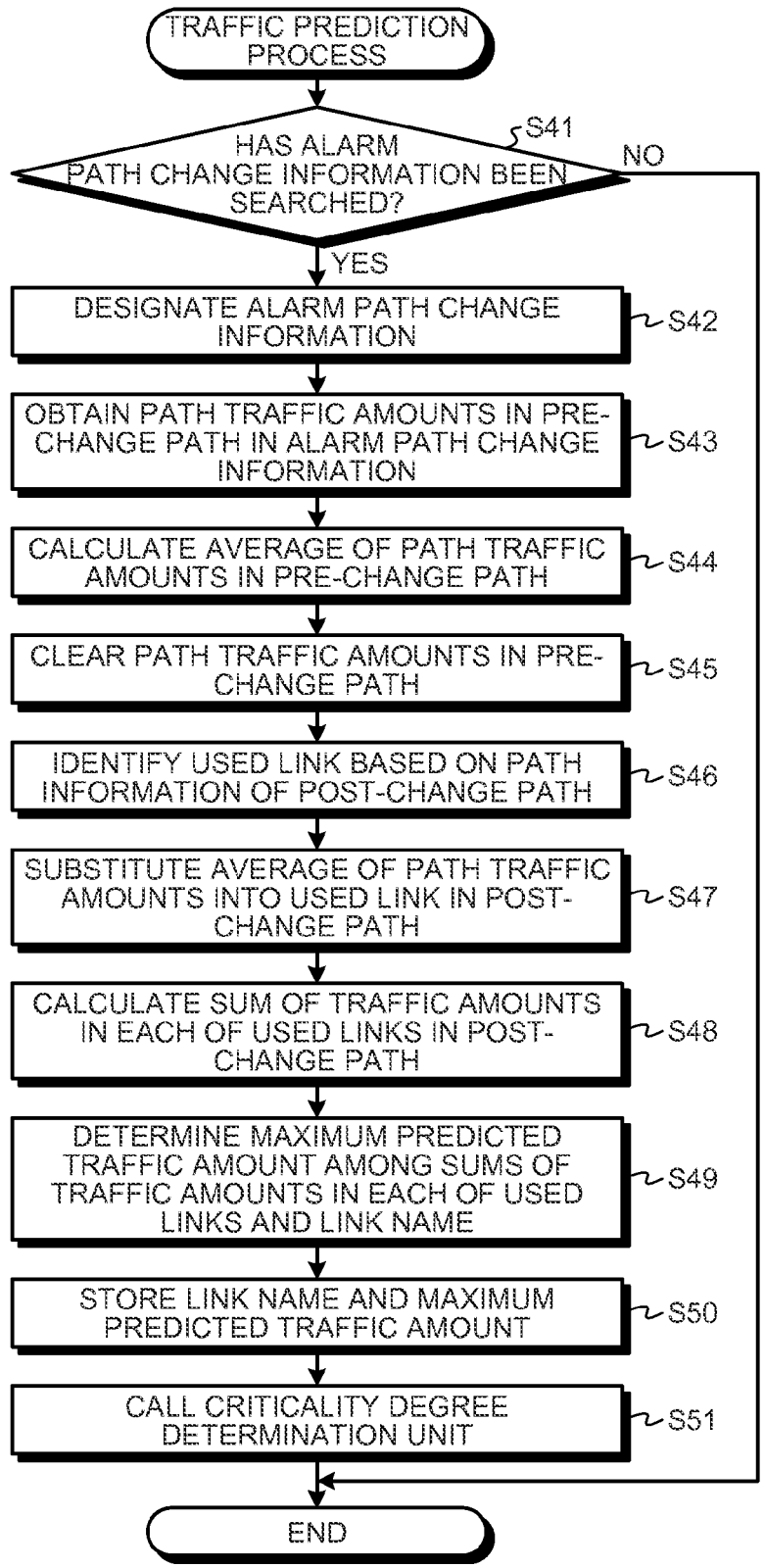
FIG. 24 is a flowchart of exemplary operations in the CPU for a traffic prediction process.
Figure 25:
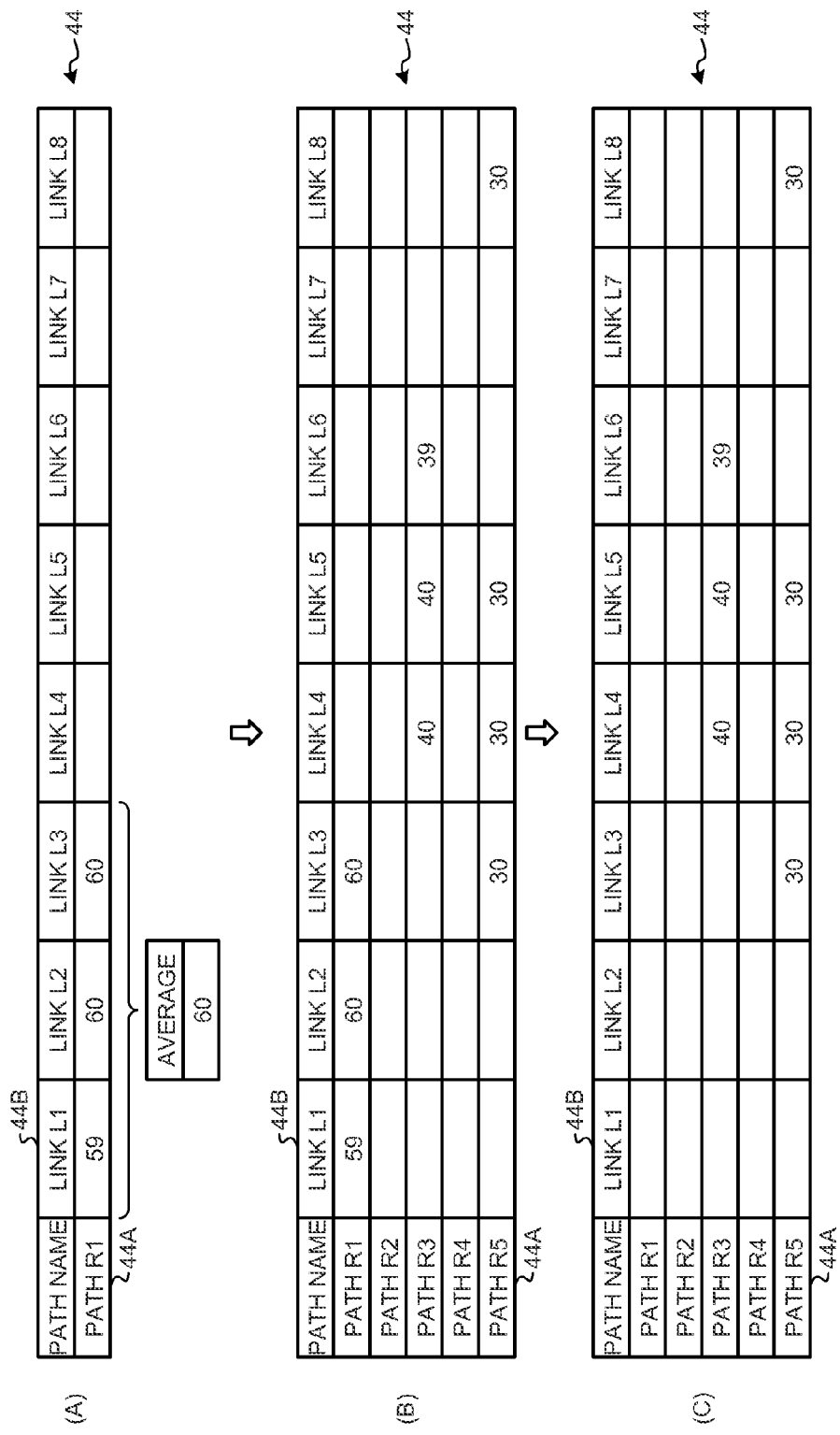
FIG. 25 is an explanatory diagram of the flow of use of the tables for the traffic prediction process.
Figure 26:
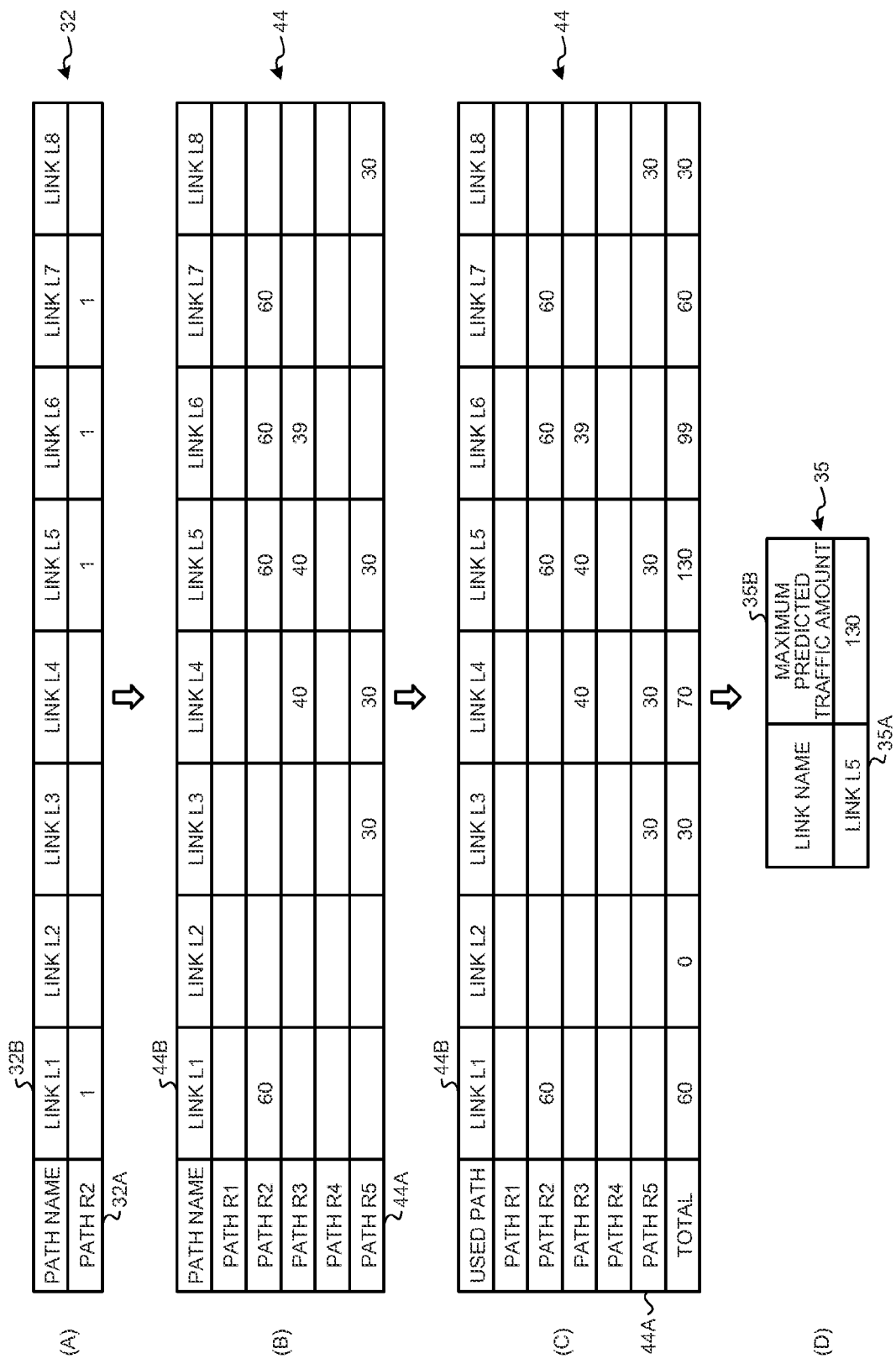
FIG. 26 is an explanatory diagram of the flow of use of the tables for the traffic prediction process.

Next, the operations for a traffic prediction process will be described with FIG. 24, FIG. 25, and FIG. 26. FIG. 24 is a flowchart of exemplary operations in the CPU 14 for the traffic prediction process. FIG. 25 and FIG. 26 are explanatory diagrams of the flow of use of the tables for the traffic prediction process. The traffic prediction process illustrated in FIG. 24 is a process in which the prediction unit 24 predicts the maximum predicted traffic amount that is the maximum sum of the predicted traffic amounts among the predicted traffic amounts of the links used in the post-change path, and predicts the link name.

In FIG. 24, the prediction unit 24 of the CPU 14 determines, in response to the call from the measurement unit 23, determines there is alarm path change information in the path change table 42 (step S41). When there is alarm path change information (Yes in step S41), the prediction unit 24 designates the alarm path change information (step S42). Further, the prediction unit 24 obtains the path traffic amounts in a pre-change path 42C (the path R1) in the designated alarm path change information (step S43).

As illustrated in (A) of FIG. 25, the prediction unit 24 calculates the average of the path traffic amounts in the pre-change path 42C (the path R1) in alarm path change information according to the path traffic amount table 44 (step S44). Note that the average is rounded, for example, to an integer. After calculating the average of the path traffic amounts in the pre-change path 42C (the path R1), the prediction unit 24 deletes the path traffic amounts of the pre-change path 42C from the path traffic amount table 44 as illustrated in (B) and (C) of FIG. 25 (step S45).

The prediction unit 24 refers to the path table 32 illustrated in (A) of FIG. 26 so as to identify a used link based on the path information of the post-change path 42D (the path R2) in the alarm path change information (step S46). Note that, in the example in (A) of FIG. 26, the links L1, L5, L6, and L7 are the used links. After identifying the used links based on the path information of the post-change path 42D, the prediction unit 24 substitutes "60" that is the average of the path traffic amounts in the pre-change path 42C calculated in step S44 into the links L1, and L5 to L7 used in the path R2 illustrated in (B) of FIG. 26 (step S47).

After substituting the average of the path traffic amounts in the pre-change path 42C into the links used in the post-change path 42D, the prediction unit 24 calculates the sum of the predicted traffic amounts at each of links used in the post-change path 42D as illustrated in (C) of FIG. 26 (step S48).

After calculating the sum of the predicted traffic amounts at each of links used in the post-change path 42D, the prediction unit 24 determines the link having the maximum predicted traffic amount among the predicted traffic amounts of the used links (step S49). Note that the prediction unit 24 determines in the example in (C) of FIG. 26 that the maximum predicted traffic amount is "130" and the link name is the link L5. The prediction unit 24 stores the maximum predicted traffic amount and the link name as the maximum predicted amount information in the maximum predicted amount table 35 as illustrated at (D) in FIG. 26 (step S50).

After storing the maximum predicted amount information, the prediction unit 24 calls the criticality degree determination unit 25 (step S51) and completes the process illustrated in FIG. 24. When there is not the alarm path change information (No in step S41), the prediction unit 24 completes the process illustrated in FIG. 24.

In the traffic prediction process illustrated in FIG. 24, the maximum predicted traffic amount that is the maximum sum of the predicted traffic amounts among the predicted traffic amounts of the links used in the post-change path, and the link name are predicted and stored as the maximum predicted amount information in the maximum predicted amount table 35. As a result, the CPU 14 can identify the maximum predicted traffic amount in the post-change path and the link name with reference to the maximum predicted amount table 35.

Figure 27:
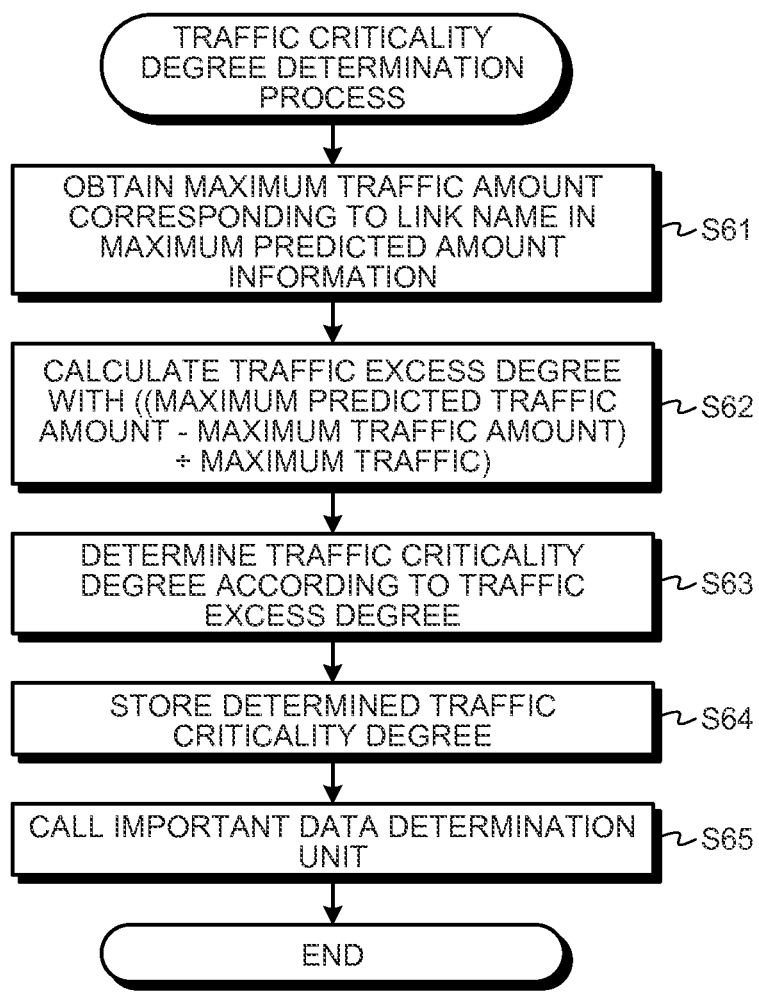
FIG. 27 is a flowchart of exemplary operations in the CPU for a traffic criticality degree determination process.
Figure 28:
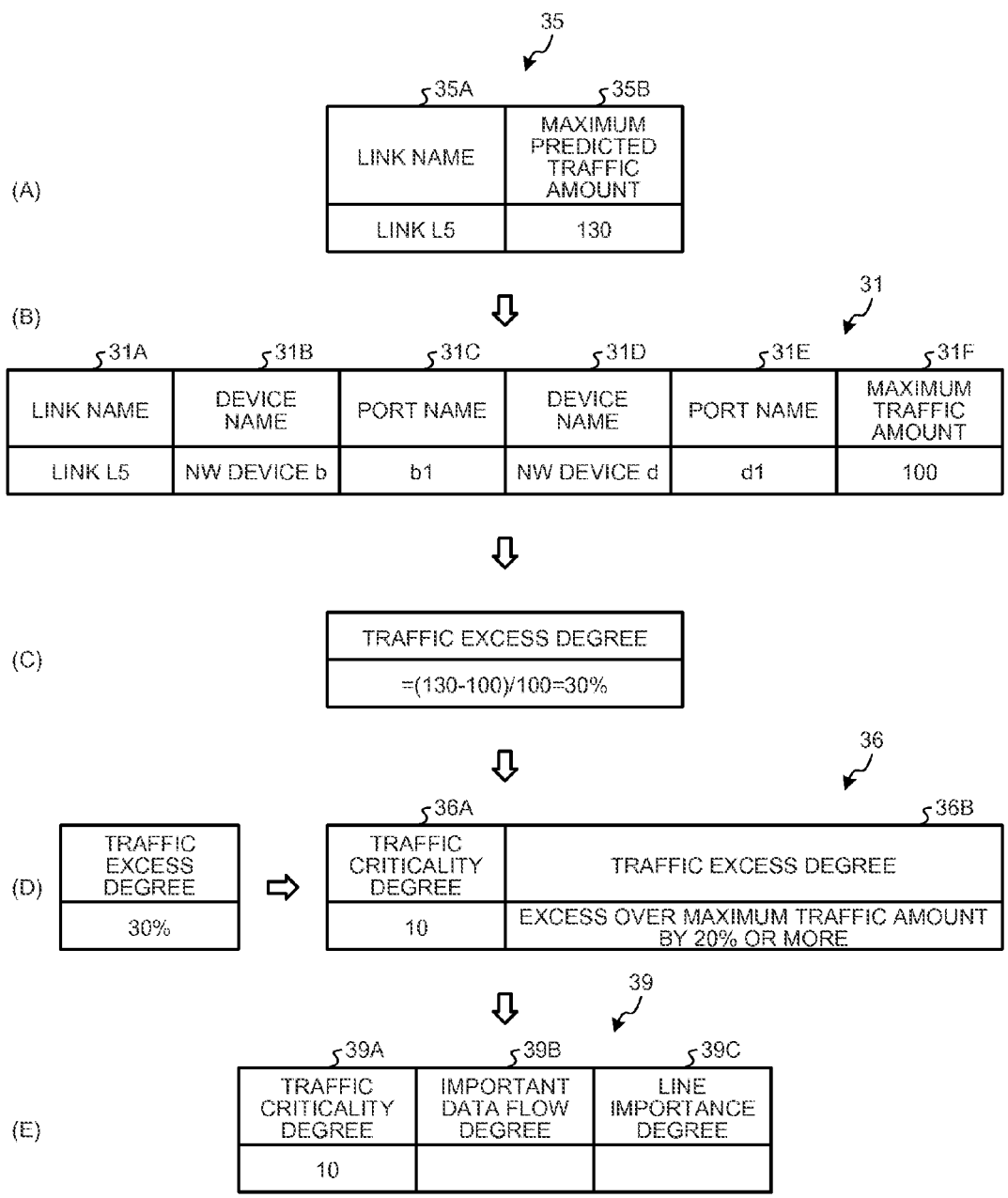
FIG. 28 is an explanatory diagram of the flow of use of the tables for the traffic criticality degree determination process.

Next, a traffic criticality degree determination process will be described with FIG. 27 and FIG. 28. FIG. 27 is a flowchart of exemplary operations in the CPU 14 for a traffic criticality degree determination process. FIG. 28 is an explanatory diagram of the flow of use of the tables for the traffic criticality degree determination process. The traffic criticality degree determination process illustrated in FIG. 27 is a process in which the criticality degree determination unit 25 calculates a traffic criticality degree based on the maximum predicted traffic amount in the maximum predicted amount information.

In FIG. 27, the criticality degree determination unit 25 in the CPU 14 obtains, in response to the call from the prediction unit 24, the maximum traffic amount 31F from the link table 31 in illustrated in (B) of FIG. 28 and corresponding to a link name 35A in the maximum predicted amount information illustrated in (A) of FIG. 28 (step S61). The criticality degree determination unit 25 calculates the traffic excess degree exceeding the maximum traffic amount corresponding to the link name in the maximum predicted amount information based on ((the maximum predicted traffic amount−the maximum traffic amount)÷the maximum traffic amount) as illustrated at (C) in FIG. 28 (step S62).

The criticality degree determination unit 25 refers to a traffic criticality degree table 36 illustrated in (D) of FIG. 28 so as to determine a traffic criticality degree 36A corresponding to the traffic excess degree 36B (step S63). The criticality degree determination unit 25 stores the traffic criticality degree 36A as influence information in the network influence degree table 39 as illustrated in (E) of FIG. 28 (step S64). Then, the criticality degree determination unit 25 calls the important data determination unit 26 (step S65) and completes the process in FIG. 27.

In the traffic criticality degree determination process illustrated in FIG. 27, the traffic excess degree of the link is calculated from the maximum predicted amount information and the traffic criticality degree according to the traffic excess degree is determined such that the determined traffic criticality degree is stored in the network influence degree table 39. As a result, the CPU 14 can calculate a traffic criticality degree indicating the excess degree of the traffic amount exceeding the maximum traffic amount corresponding to the link in the post-change path, namely, the degree of overload in the network when a path change occurs.

Figure 29:
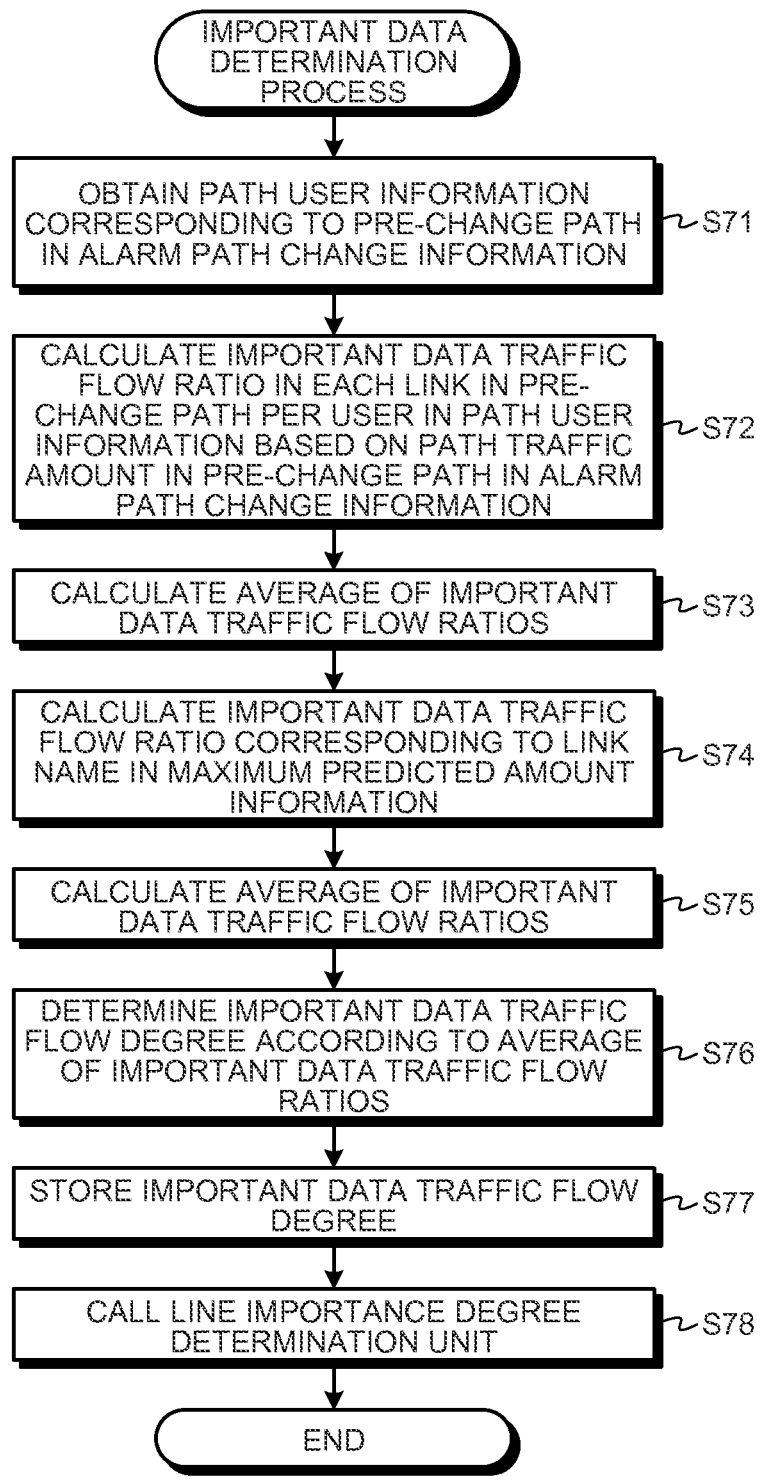
FIG. 29 is a flowchart of exemplary operations in the CPU for an important data determination process.
Figure 30:
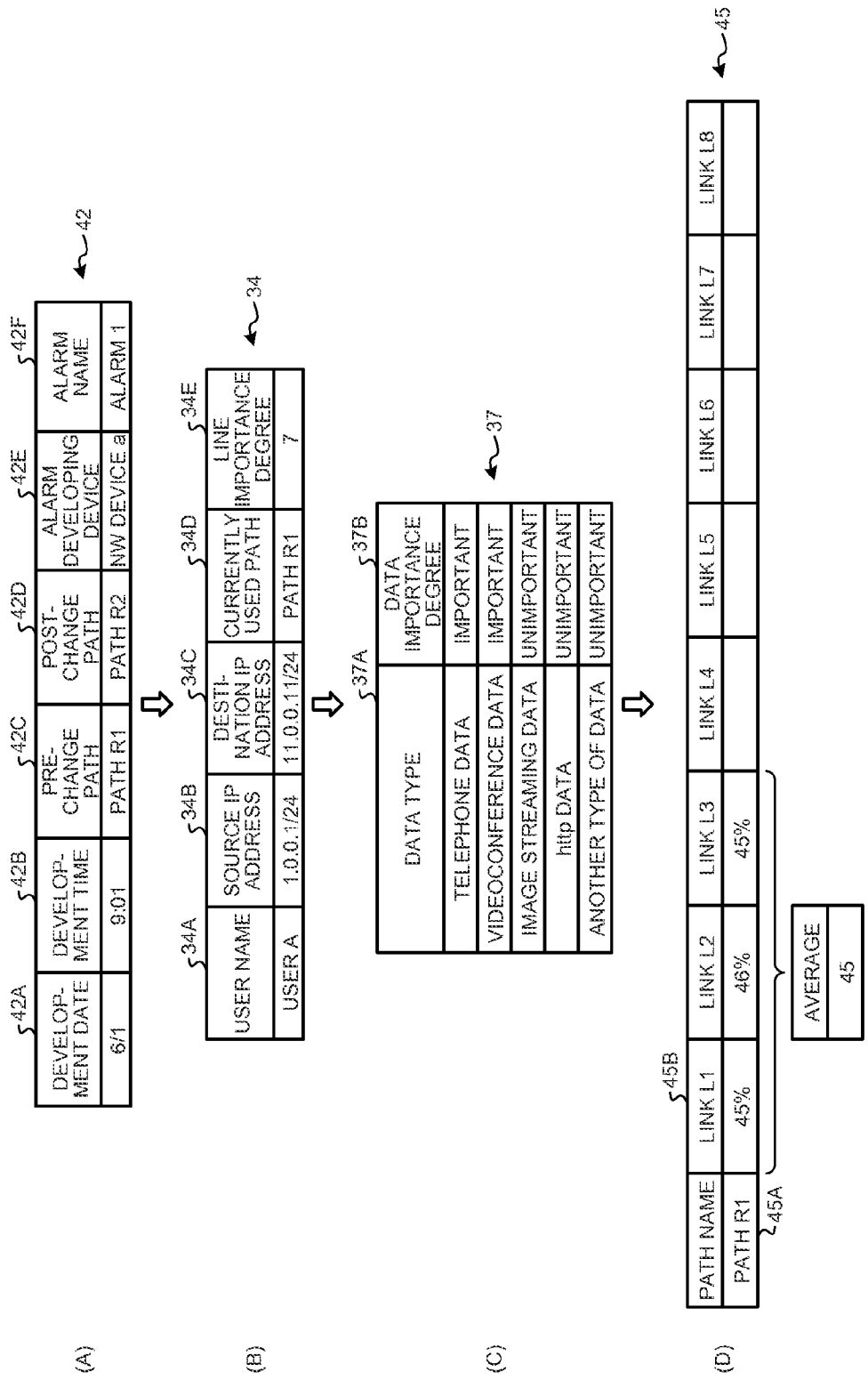
FIG. 30 is an explanatory diagram of the flow of use of the tables for the important data determination process.
Figure 31:
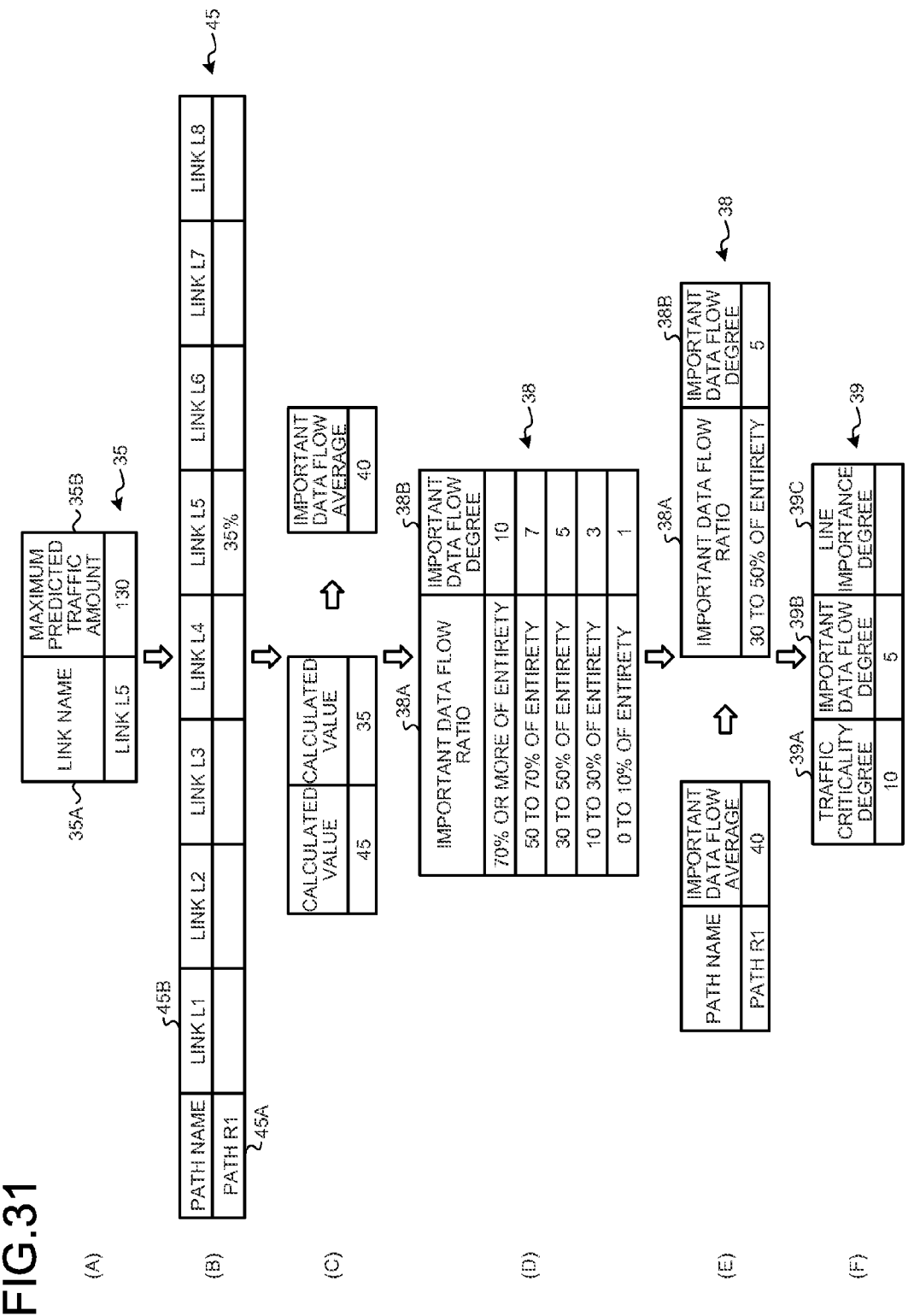
FIG. 31 is an explanatory diagram of the flow of use of the tables for the important data determination process.

Next, an important data determination process will be described with FIG. 29, FIG. 30, and FIG. 31. FIG. 29 is a flowchart of exemplary operations in the CPU 14 for an important data determination process. FIG. 30 and FIG. 31 are explanatory diagrams of the flow of use of the tables for the important data determination process. The important data determination process illustrated in FIG. 29 is a process in which the important data determination unit 26 determines the important data flow degree based on the flow ratio of the important data through each link in the pre-change path 42C and the flow ratio of the important data through the link having the maximum predicted traffic amount.

In FIG. 29, the important data determination unit 26 in the CPU 14 determines, in response to the call from the criticality degree determination unit 25, determines whether the important data determination unit 26 has obtained the path user information corresponding to the pre-change path 42C in the alarm path change information as illustrated in (A) and (B) of FIG. 30 (step S71). The important data determination unit 26 calculates the traffic flow ratio of the important data of the path user per link in the pre-change path 42C based on the path traffic amount in the pre-change path 42C in the alarm path change information as illustrated at (D) in FIG. 30 (step S72). Note that, to determine whether the data is important, the data importance degree table 37 in (C) of FIG. 30 is referenced.

The important data determination unit 26 calculates the average of the traffic flow ratios of the important data of the links in the pre-change path as illustrated at (D) in FIG. 30 (step S73). Note that, when being calculated, the average is rounded, for example, to an integer. The important data determination unit 26 calculates the traffic flow ratio of important data in the link of the link name 35A in the maximum predicted amount information as illustrated in (A) and (B) of FIG. 31 (step S74). The important data determination unit 26 calculates the average between the average of the traffic flow ratios of the important data calculated in step S73 and the traffic flow ratio of the important data calculated in step S74 as illustrated in (C) of FIG. 31 (step S75). Note that the important data determination unit 26 calculates the average (40%) between the traffic flow ratio of the important data in the pre-change path (45%) and the traffic flow ratio of the important data in the link of the maximum predicted amount information (35%).

The important data determination unit 26 refers to the important data flow degree table 38 as illustrated in (D) of FIG. 31 so as to determine an important data flow degree 38B corresponding to an calculated average of the important data traffic flow ratios 38A (step S76). For example, when the average is "40", the important data determination unit 26 determines the important data flow degree "5" corresponding to the fact that the important data traffic amount accounts for 30 to 50% of the entirety as illustrated in (E) of FIG. 31. The important data determination unit 26 stores the determined important data flow degree 38B as the influence degree information in the network influence degree table 39 as illustrated in (F) of FIG. 31 (step S77). After storing the important data flow degree in the network influence degree table 39, the important data determination unit 26 calls the line importance degree determination unit 27 (step S78) and completes the process illustrated in FIG. 29.

In the important data determination process illustrated in FIG. 29, the traffic amount of highly important data is measured and the important data flow degree is determined such that the determined important data flow degree is stored in the network influence degree table 39. As a result, the CPU 14 can calculate the important data flow degree that is the traffic amount of the currently flowing important data.

Figure 32:
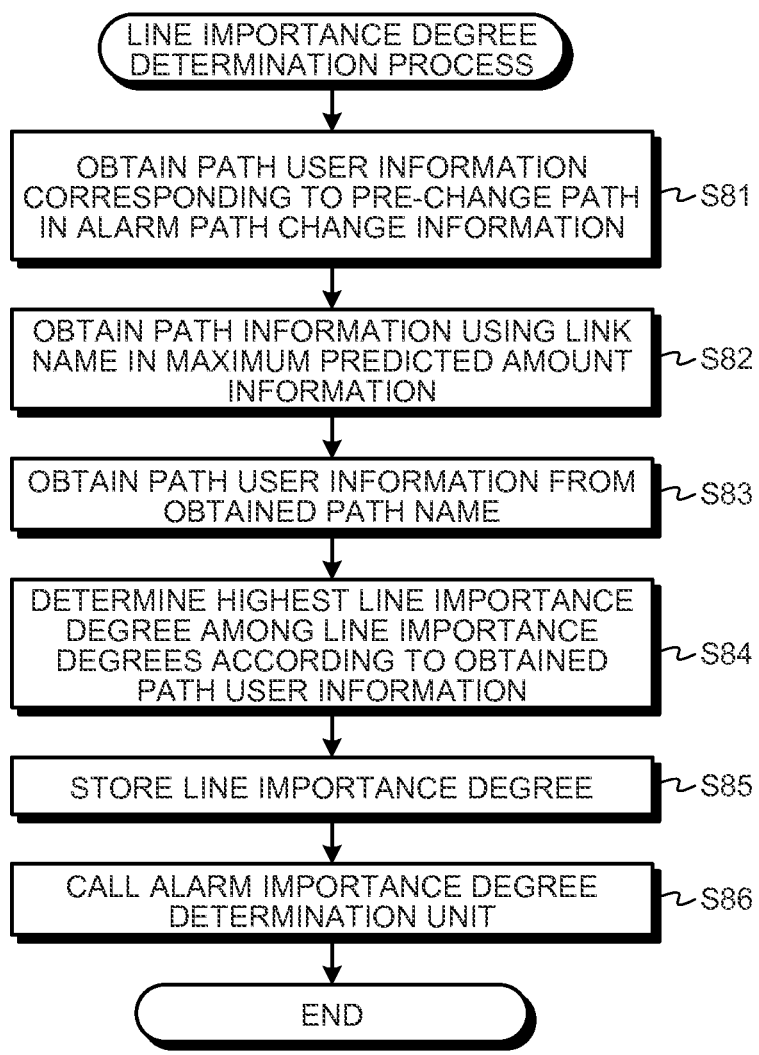
FIG. 32 is a flowchart of exemplary operations in the CPU for a line importance degree determination process.
Figure 33:
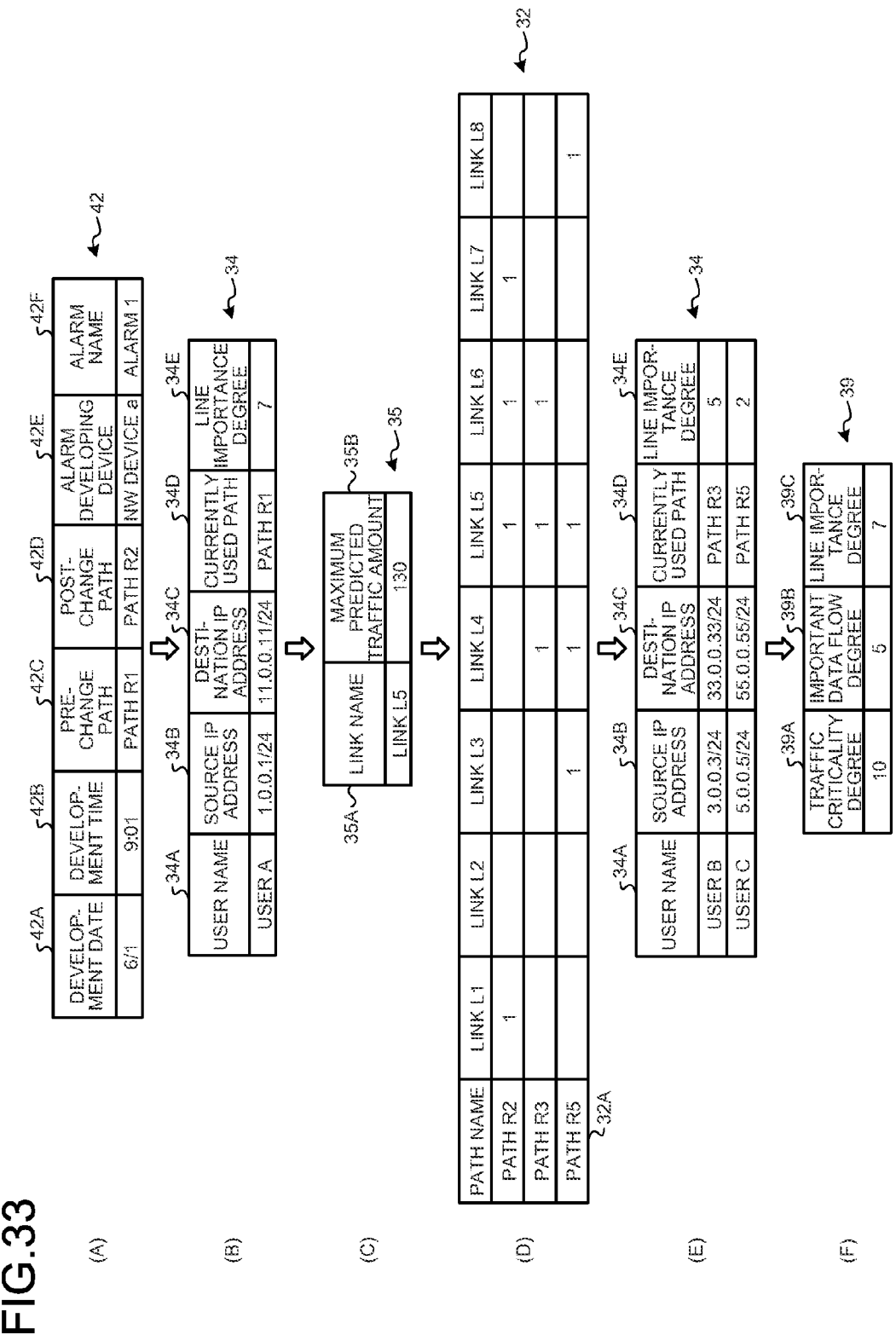
FIG. 33 is an explanatory diagram of the flow of use of the tables for the line importance degree determination process.

Next, a line importance degree determination process will be described with FIG. 32 and FIG. 33. FIG. 32 is a flowchart of exemplary operations in the CPU 14 for a line importance degree determination process. FIG. 33 is an explanatory diagram of the flow of use of the tables for the line importance degree determination process. The line importance degree determination process illustrated in FIG. 32 is a process in which the line importance degree determination unit 27 determines a line importance degree based on the line importance degree corresponding to the pre-change path, and the line importance degree corresponding to the link in the maximum predicted amount information.

In FIG. 32, the line importance degree determination unit 27 in the CPU 14 obtains the path user information corresponding to the pre-change path 42C in the alarm path change information as illustrated in (A) and (B) of FIG. 33 (step S81). The line importance degree determination unit 27 obtains the path information using the link name 35A in the maximum predicted amount information as illustrated in (C) and (D) of FIG. 33 (step S82).

The line importance degree determination unit 27 obtains the path user information including the obtained path information as illustrated in (E) of FIG. 33 (step S83). The line importance degree determination unit 27 determines the highest line importance degree among the line importance degrees in the obtained path user information (step S84). The line importance degree determination unit 27 stores the determined line importance degree as the influence degree information in the network influence degree table 39 as illustrated in (F) of FIG. 33 (step S85). The line importance degree determination unit 27 calls the alarm importance degree determination unit 28 (step S86) and completes the process illustrated in FIG. 32.

In the line importance degree determination process illustrated in FIG. 32, a line importance degree is determined based on the line importance degree corresponding to the pre-change path and the line importance degree corresponding to the link in the maximum predicted amount information after the path change. As a result, the CPU 14 determines the line importance degree indicating the degree of confusion when an alarm develops.

Figure 34:
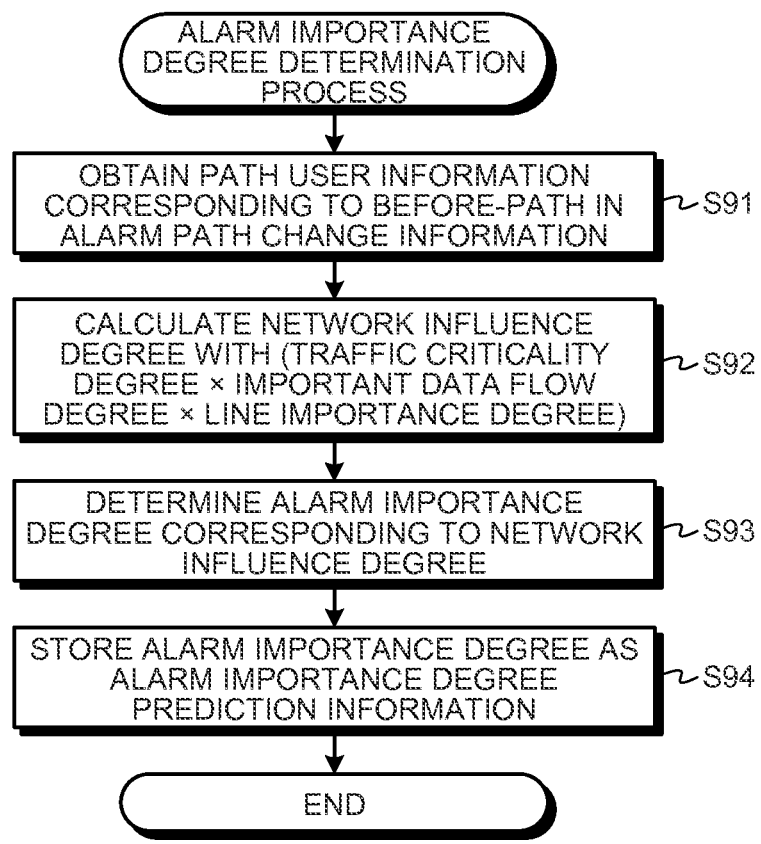
FIG. 34 is a flowchart of exemplary operations in the CPU for an alarm importance degree determination process.
Figure 35:
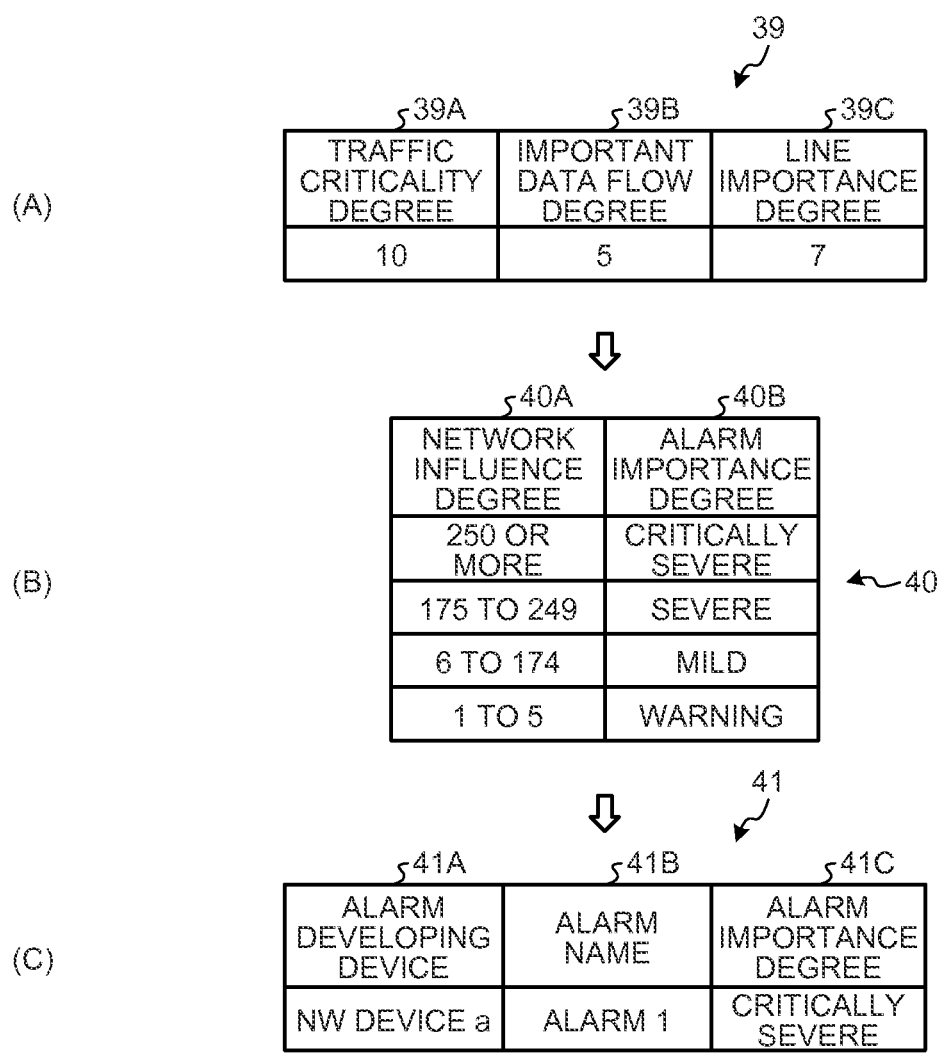
FIG. 35 is an explanatory diagram of the flow of use of the tables for the alarm importance degree determination process.

Next, an alarm importance degree determination process will be described with FIG. 34 and FIG. 35. FIG. 34 is a flowchart of exemplary operations in the CPU 14 for an alarm importance degree determination process. FIG. 35 is an explanatory diagram of the flow of use of the tables for the alarm importance degree determination process. The alarm importance degree determination process illustrated in FIG. 34 is a process in which the alarm importance degree determination unit 28 determines an alarm importance degree based on the traffic criticality degree, the important data flow degree and the line importance degree that are the influence degree information.

In FIG. 34, the alarm importance degree determination unit 28 in the CPU 14 obtains, in response to the call from the line importance degree determination unit 27, the path user information corresponding to the pre-change path 42C in the alarm path change information (step S91). The alarm importance degree determination unit 28 calculates a network influence degree using (the traffic criticality degree×the important data flow degree×the line importance degree) based on the traffic criticality degree, the important data flow degree and the line importance degree in the network influence degree table 39 in (A) of FIG. 35 (step S92). Note that, when the traffic criticality degree is "10", the important data flow degree is "5" and the line importance degree is "7", the network influence degree is 350 from (10×5×7) in the alarm importance degree determination unit 28.

The alarm importance degree determination unit 28 refers to the alarm importance degree determination table 40 as illustrated in (B) of FIG. 35 so as to determine an alarm importance degree 40B corresponding to the network influence degree 40A (step S93). Note that the alarm importance degree 40B is "critically severe" in the alarm importance degree determination unit 28 because the network influence degree is 350. The alarm importance degree determination unit 28 stores the determined alarm importance degree 40B as the alarm importance degree prediction information in a alarm importance degree table 41 as illustrated in (C) of FIG. 35 (step S94) and completes the process illustrated in FIG. 34. As a result, the alarm importance degree determined in the alarm importance degree determination unit 28 as well as the alarm developing device are linked to the alarm name received in the reception unit 22 such that they are registered as the alarm importance degree prediction information.

In the alarm importance degree determination process illustrated in FIG. 34, a network influence degree is calculated based on the traffic criticality degree, the important data flow degree and the line importance degree such that the alarm importance degree according to the network influence degree and relating to the received alarm is determined. As a result, the alarm importance degree that reflects the traffic criticality degree, the important data flow degree and the line importance degree and that is appropriate to the contents of the alarm with a high degree of accuracy can be predicted.

According to the present embodiment, an alarm importance degree appropriate to the contents of the alarm with a high degree of accuracy can be predicted. As a result, the user easily determines whether to handle the alarm at the highest priority. The alarm can be handled in advance at the right time. This improves the convenience for the user.

According to the present embodiment, a network influence degree is calculated based on the traffic criticality degree, the important data flow degree, and the line importance degree such that an alarm importance degree according to the network influence degree is calculated. This can predict the alarm importance degree that reflects the traffic criticality degree, the important data flow degree, and the line importance degree and that is appropriate to the contents of the alarm with a high degree of accuracy.

Note that, although being calculated based on the traffic criticality degree, the important data flow degree, and the line importance degree in the embodiment, the network influence degree can be calculated at least based on the traffic criticality degree.

The network influence degree can also be calculated based on the traffic criticality degree and the important data flow degree. In that case, a network influence degree reflecting the traffic amount of the currently flowing important data can be calculated.

The network influence degree can also be calculated based on the traffic criticality degree and the line importance degree. In that case, a network influence degree reflecting the degree of confusion when the alarm develops can be calculated.

Further, each of the components in the units illustrated in the drawings does not need to physically have the same structure as in the drawings. In other words, the specific formation of the division or integration of the components is not limited to the formation illustrated in the drawings. The whole of or some of the components can functionally or physically be divided or integrated in an arbitrary unit according to various loads, usage conditions, or the like.

Further, the whole of or an arbitrary part of the processing functions performed in each unit can be executed on a microcomputer such as a Central Processing Unit (CPU), a Micro Processing Unit (MPU), and a Micro Controller Unit (MCU). It is needless to say that the whole of or an arbitrary part of the processing functions can be performed on a program analyzed and executed in the CPU (or a microcomputer such as the MPU, or the MCU) or on the hardware with a wired logic.

The aspect to be disclosed can predict an appropriate alarm importance degree according to the contents of an alarm.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication monitor comprising:
a memory; and
a processor coupled to the memory,
wherein the processor executes a process, the process including:
generating alarm path change information including path change information when a path is changed and an alarm developing when the path is changed in a network;
searching alarm path change information corresponding to a new alarm when the alarm is received;
predicting a traffic amount in a post-change path based on a traffic amount in a pre-change path in the alarm path change information searched in the searching;
calculating a criticality degree in the network based on a ratio of the traffic amount in the post-change path predicted in the predicting, the ratio of the traffic amount exceeding a predetermined allowable amount; and
determining an alarm importance degree of the received alarm corresponding to an influence degree based on the criticality degree calculated in the calculating.

2. The communication monitor according to claim 1, wherein the calculating calculates the criticality degree based on a ratio of a traffic amount of a link having a maximum predicted traffic amount among links in the post-change path, the ratio of the traffic amount exceeding a predetermined allowable amount.

3. The communication monitor according to claim 1, further comprising:
a line importance degree storage unit that stores a line importance degree of a path used by each user,
wherein the process further includes first determining the line importance degree according to a user of the pre-change path, and
wherein the determining determines the alarm importance degree corresponding to the influence degree based on the criticality degree and the line importance degree determined in the first determining.

4. The communication monitor according to claim 1, wherein the process further includes calculating an important data flow degree based on a flow ratio of important data to a traffic amount flowing through each link of the pre-change path and a flow ratio of important data to the traffic amount flowing through the link having a maximum predicted traffic amount among the links in the post-change path, and
wherein the determining determines the alarm importance degree corresponding to the influence degree based on the criticality degree and the important data flow degree calculated.

5. The communication monitor according to claim 1, further comprising:
a line importance degree storage unit that stores a line importance degree of a path used by each user,
wherein the process further includes:
calculating an important data flow degree based on a flow ratio of important data to a traffic amount flowing through each link of the pre-change path and a flow ratio of important data to the traffic amount flowing through the link having a maximum predicted traffic amount among the links in the post-change path; and
first determining the line importance degree according to the user of the pre-change path, and
determining determines the alarm importance degree corresponding to the influence degree based on the criticality degree, the important data flow degree calculated, the line importance degree determined in the first determining.

6. The communication monitor according to claim 1, further comprising:
an alarm importance degree storage unit that stores an alarm importance degree of each of the influence degrees,
wherein the determining refers to the alarm importance degree storage unit so as to determine the alarm importance degree corresponding to the influence degree.

7. A prediction method of a communication monitor, the prediction method comprising:
generating alarm path change information including path change information when a path is changed and an alarm developing when the path is changed in a network;
searching alarm path change information corresponding to a new alarm when the alarm is received;
predicting a traffic amount in a post-change path based on a traffic amount in a pre-change path in the searched alarm path change information;
calculating a criticality degree in the network based on a ratio of the predicted traffic amount in the post-change path, the ratio of the traffic amount exceeding a predetermined allowable amount; and
determining an alarm importance degree of the received alarm corresponding to an influence degree based on the calculated criticality degree.

8. A non-transitory computer-readable recording medium having stored therein a prediction program that causes a computer to execute a process comprising:
generating alarm path change information including path change information when a path is changed and an alarm developing when the path is changed in a network;
searching alarm path change information corresponding to a new alarm when the alarm is received;
predicting a traffic amount in a post-change path based on a traffic amount in a pre-change path in the searched alarm path change information;
calculating a criticality degree in the network based on a ratio of the predicted traffic amount in the post-change path, the ratio of the traffic amount exceeding a predetermined allowable amount; and
determining an alarm importance degree of the received alarm corresponding to an influence degree based on the calculated criticality degree.

* * * * *